US010040537B2

(12) United States Patent
Charles et al.

(10) Patent No.: US 10,040,537 B2
(45) Date of Patent: Aug. 7, 2018

(54) LAMINATE COMPOSITE WING STRUCTURES

(71) Applicant: The Boeing Company, Chicago, IL (US)

(72) Inventors: Jordan Charles, Seattle, WA (US); William M. Sampedro-Thompson, Mill Creek, WA (US); Jessica L. Watkins, Bothell, WA (US); Ryan Christopher Roache, Woodinville, WA (US); Michael John Gamble, Redmond, WA (US); Tyler W. Downey, Bellevue, WA (US); Wendell C. K. Choy, Kirkland, WA (US); Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 14/598,002

(22) Filed: Jan. 15, 2015

(65) Prior Publication Data
US 2016/0207607 A1     Jul. 21, 2016

(51) Int. Cl.
*B24C 1/06*         (2006.01)
*B64C 3/18*         (2006.01)
(Continued)

(52) U.S. Cl.
CPC .............. *B64C 3/187* (2013.01); *B64C 1/064* (2013.01); *B64C 1/12* (2013.01); *B64C 3/182* (2013.01);
(Continued)

(58) Field of Classification Search
CPC ........... B64C 1/064; B64C 1/12; B64C 3/182; B64C 3/18; B64C 3/187
See application file for complete search history.

(56) References Cited

U.S. PATENT DOCUMENTS 4,053,667 A    10/1977  Smith
6,849,150 B1    2/2005  Schmidt
(Continued)

FOREIGN PATENT DOCUMENTS

EP    2336021 A2    6/2011
EP    2489590 A1    8/2012
(Continued)

OTHER PUBLICATIONS

European Patent Office, Extended European Search Report in European Patent Application No. 15196742.9, dated Jun. 16, 2016, 8 pages.

*Primary Examiner* — Elizabeth A Quast
(74) *Attorney, Agent, or Firm* — Kolisch Hartwell, P.C.

(57) ABSTRACT

A wing may include a wing skin, a laminate composite first stringer, a rib, and at least one fastener. A majority of the first stringer may be characterized by a stacked plurality of generally planar plies of reinforcement material structurally joined as a stack to an interior surface of the wing skin and extending generally parallel to the interior surface and a span-wise direction of the wing along a substantial portion of the interior surface. The first stringer may have a generally solid trapezoidal cross section when viewed in a plane that is generally perpendicular to the span-wise direction. The rib may be positioned adjacent the interior surface, and may extend generally perpendicular to the span-wise direction. The trapezoidal cross section may be interfaced with the rib flange. The fastener may extend through the wing skin, the trapezoidal cross section, and the rib flange.

20 Claims, 11 Drawing Sheets

(51) Int. Cl.
  *B64C 1/06* (2006.01)
  *B64C 1/12* (2006.01)
  *B64C 3/20* (2006.01)
  *B64C 3/26* (2006.01)

(52) U.S. Cl.
  CPC ............... *B64C 3/20* (2013.01); *B64C 3/26* (2013.01); *Y02T 50/433* (2013.01)

(56) References Cited

U.S. PATENT DOCUMENTS

| | | |
|---|---|---|
| 7,244,487 B2 | 7/2007 | Brantley et al. |
| 7,293,737 B2 | 11/2007 | Engwall et al. |
| 7,398,586 B2 | 7/2008 | Prichard et al. |
| 7,494,092 B2 | 2/2009 | Brenner et al. |
| 7,530,530 B2 | 5/2009 | Engwall et al. |
| 7,897,004 B2 | 3/2011 | Engwall et al. |
| 8,276,848 B2 | 10/2012 | Zuñiga Sagredo |
| 8,540,921 B2 | 9/2013 | Senibi et al. |
| 8,714,485 B2 | 5/2014 | Matheson et al. |
| 8,763,253 B2 | 7/2014 | Kamaraj et al. |
| 9,242,393 B2* | 1/2016 | Bland ................ B29C 70/205 |
| 9,327,470 B1* | 5/2016 | Krajca ............... B29D 99/0014 |
| 9,387,657 B2* | 7/2016 | Smith, Jr. ........... B29C 70/541 |
| 9,393,744 B2* | 7/2016 | Anderson ............ B29C 70/52 |
| 2005/0230552 A1 | 10/2005 | Engwall et al. |
| 2007/0107189 A1* | 5/2007 | Prichard ............. B29C 33/307 29/448 |
| 2008/0110563 A1 | 5/2008 | Engwall et al. |
| 2008/0173757 A1* | 7/2008 | Tanner ................ B64C 3/26 244/119 |
| 2008/0246175 A1* | 10/2008 | Biornstad ........... B29C 53/587 264/109 |
| 2009/0127393 A1 | 5/2009 | Guzman et al. |
| 2011/0139932 A1 | 6/2011 | Matheson et al. |
| 2011/0315824 A1 | 12/2011 | Pook et al. |
| 2012/0052247 A1* | 3/2012 | Pook .................. B29C 65/5057 428/161 |
| 2012/0291285 A1 | 11/2012 | Kamaraj et al. |
| 2012/0292446 A1 | 11/2012 | Kamaraj et al. |
| 2012/0308770 A1* | 12/2012 | Eli-Eli ................ B29C 70/22 428/120 |
| 2013/0084434 A1* | 4/2013 | Kehrl ................. B29C 70/207 428/174 |
| 2014/0248462 A1 | 9/2014 | Kamaraj et al. |

FOREIGN PATENT DOCUMENTS

| | | |
|---|---|---|
| EP | 2532580 A2 | 12/2012 |
| EP | 2764987 A1 | 8/2014 |
| JP | 2002-293295 A | 10/2002 |
| WO | 2005105402 A1 | 11/2005 |
| WO | 2012158217 A1 | 11/2012 |

\* cited by examiner

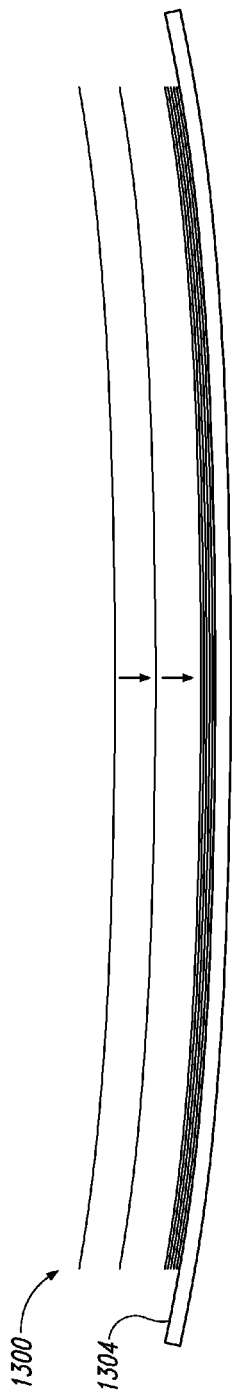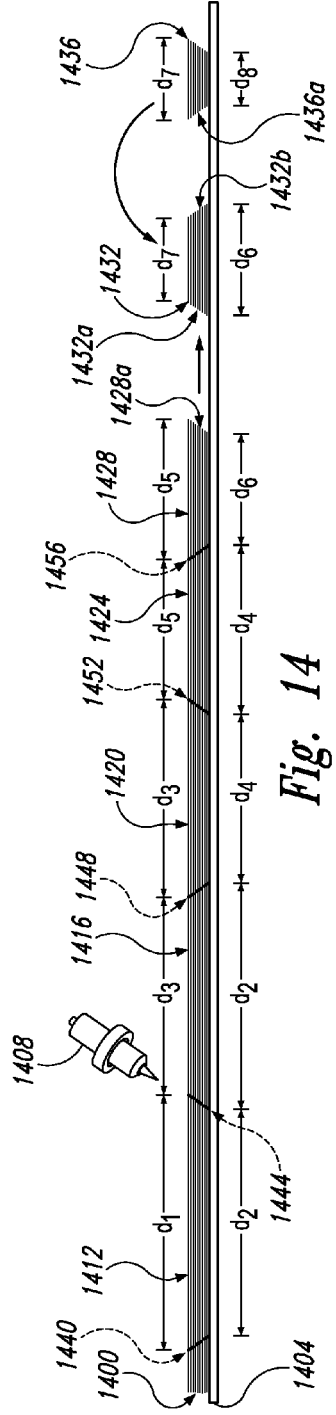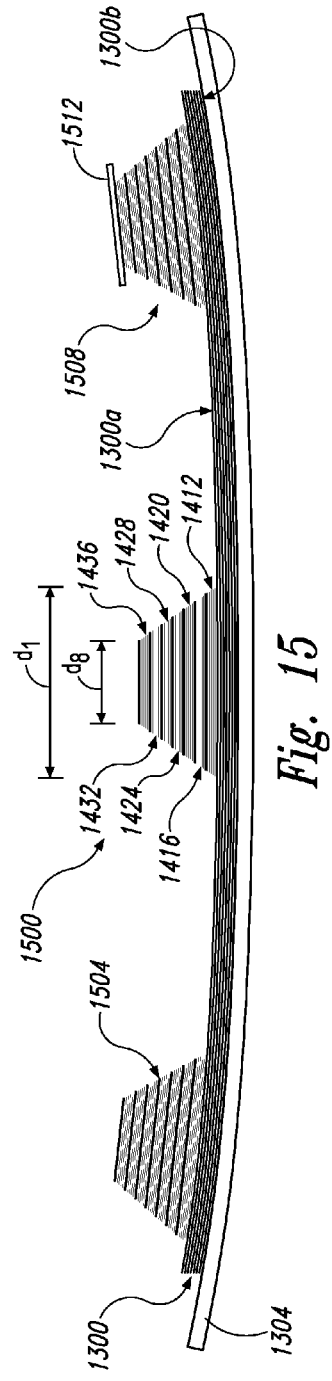

LAMINATE COMPOSITE WING STRUCTURES

FIELD

This disclosure relates to laminate composite wing structures. More specifically, the disclosed embodiments relate to systems and methods for stiffening a wing, such as that of an aircraft wing assembly, that of an aircraft horizontal stabilizer assembly, and/or that of a control surface torque box assembly.

INTRODUCTION

It is desirable for aircraft structures to be capable of reacting to loads in a variety of different directions. For example, it is desirable for an aircraft wing to be capable of reacting to aerodynamic loads that are imposed on the wing during flight. Such aerodynamic loads include bending loads that are reacted by a wingbox structure of the wing, or components thereof.

Generally, a wingbox structure of an aircraft includes a stiffened upper panel, a stiffened lower panel, a front spar that connects the leading edges of the panels, a rear spar that connects the trailing edges of the panels, and internal ribs that provide shape and support and connect to the panels and the spars. Generally, bending loads are reacted by the spars, and by the stringers that stiffen the panels. Typically, the ribs maintain the aerodynamic shape of the wings and/or assist in distributing loads that are imposed on the wings.

In some applications, one or more of the above mentioned elements may be constructed from one or more composite materials. Composite materials are tough, light-weight materials created by combining two or more dissimilar components. For example, a composite material may include fibers and resins. The fibers and resins may be combined to form a cured composite material. A common type of composite material used in aircraft construction is carbon fiber composite. Common forms of carbon fiber composite include pre-preg thermoset composite, dry fiber thermoset composite, and thermoplastic composite.

Typically, a lower stiffened panel of a carbon fiber wing is a bonded assembly including a carbon fiber laminate skin with carbon fiber laminate stiffeners bonded to the skin. However, the stiffener (or stringer) cross sections are primarily 'I' shaped or 'T' shaped, and the ribs generally must employ individual 'feet' that straddle the vertical webs of the stiffeners and tie into the skin. This complicated rib-to-panel interface is typically required as ribs generally cannot be attached to the respective upper (free) flanges of the carbon fiber stiffeners, as the carbon fiber stiffeners are characterized by several individual charges which are bonded together and have a tendency to separate under rib-induced loads. Further, the upper flanges typically extend significantly from the lower wing skin into the interior of the wing box, resulting in decreased internal clearance (e.g., for performing maintenance) and an increased exterior vertical profile, which may be undesirable in some applications.

Further, it is generally difficult to construct 'I' shaped stringers or 'T' shaped stringers that are curved. For example, such curved bladed stringers may have a plurality of associated radiuses extending in different planes. Moreover, structural characteristics of such bladed curved stringers may result in these stringers being more susceptible to rollover loads.

SUMMARY

Disclosed herein are examples of apparatuses, methods and systems, which may address the above mentioned problems, among others.

In one example, a wing may include a wing skin, a laminate composite first stringer, a rib, and at least one fastener. The wing skin may have an interior surface with a length extending generally parallel to a span-wise direction of the wing. A majority of the first stringer may be characterized by a stacked plurality of generally planar plies of reinforcement material structurally joined as a stack to the interior surface and extending generally parallel to the interior surface and the span-wise direction along a substantial portion of the interior surface. The first stringer may have a generally solid trapezoidal cross section when viewed in a plane that is generally perpendicular to the span-wise direction such that a first ply of the stacked plurality of generally planar plies proximal to the interior surface has a wider width than a second ply of the stacked plurality of generally planar plies that is further from the interior surface than the first ply. The rib may be positioned adjacent the interior surface, and may extend generally perpendicular to the span-wise direction. The rib may include a rib flange, and may be shaped to define a passageway between the rib flange and the interior surface. The first stringer may pass through the passageway such that the trapezoidal cross section is interfaced with the rib flange. The fastener may extend through the wing skin, the trapezoidal cross section, and the rib flange.

In another example, a wing for an aircraft may include a lower wing skin, a plurality of stringers, a rib, and a fastener. The lower wing skin may define a lower exterior surface of the wing. The plurality of stringers may be joined to the lower wing skin. The rib may extend generally perpendicular to the stringers, and may be positioned opposite the lower wing skin relative to the stringers. The fastener may extend through the lower wing skin, through a first stringer of the plurality of stringers, and into the rib. The lower wing skin may be a laminate composite. Further, each stringer may be a laminate composite including a respective plurality of plies of reinforcement material structurally joined to the lower wing skin by matrix material. Each ply of the plurality of plies may be generally locally parallel to the lower exterior surface of the wing. Each stringer may have a cross section extending in a plane substantially parallel to and aligned with the rib. Each cross section may be generally tapered and solid, with a width that decreases as measured locally parallel to the lower exterior surface of the wing, when progressing from adjacent the lower wing skin to adjacent the rib. The plurality of plies may fill a substantial portion of the respective cross section.

In another example, a method of stiffening a wing may include a step of positioning a rib adjacent an interior surface of a laminate composite lower wing skin of the wing such that the rib is oriented generally perpendicular to a span-wise direction of the wing. The wing may include a laminate composite stringer formed by a tapered stack of generally planar plies of reinforcement material structurally joined to the interior surface and extending generally parallel to the interior surface and to the span-wise direction along a substantial portion of the interior surface. The method may further include a step of operatively coupling the rib to the lower wing skin and the stringer at least in part by extending at least one fastener through the lower wing skin, through the tapered stack of generally planar plies, and through a flange of the rib, thereby stiffening the wing.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 13 is a schematic diagram showing a plurality of wing skin plies being stacked on a skin caul.

FIG. 14 is a semi-schematic diagram showing a plurality of stacked stringer plies being cut to form a plurality of trapezoidal stacks.

FIG. 15 is a semi-schematic diagram showing the trapezoidal stacks positioned on the stacked wing skin plies to form a plurality of stringers.

DESCRIPTION

Overview

Figure 1:
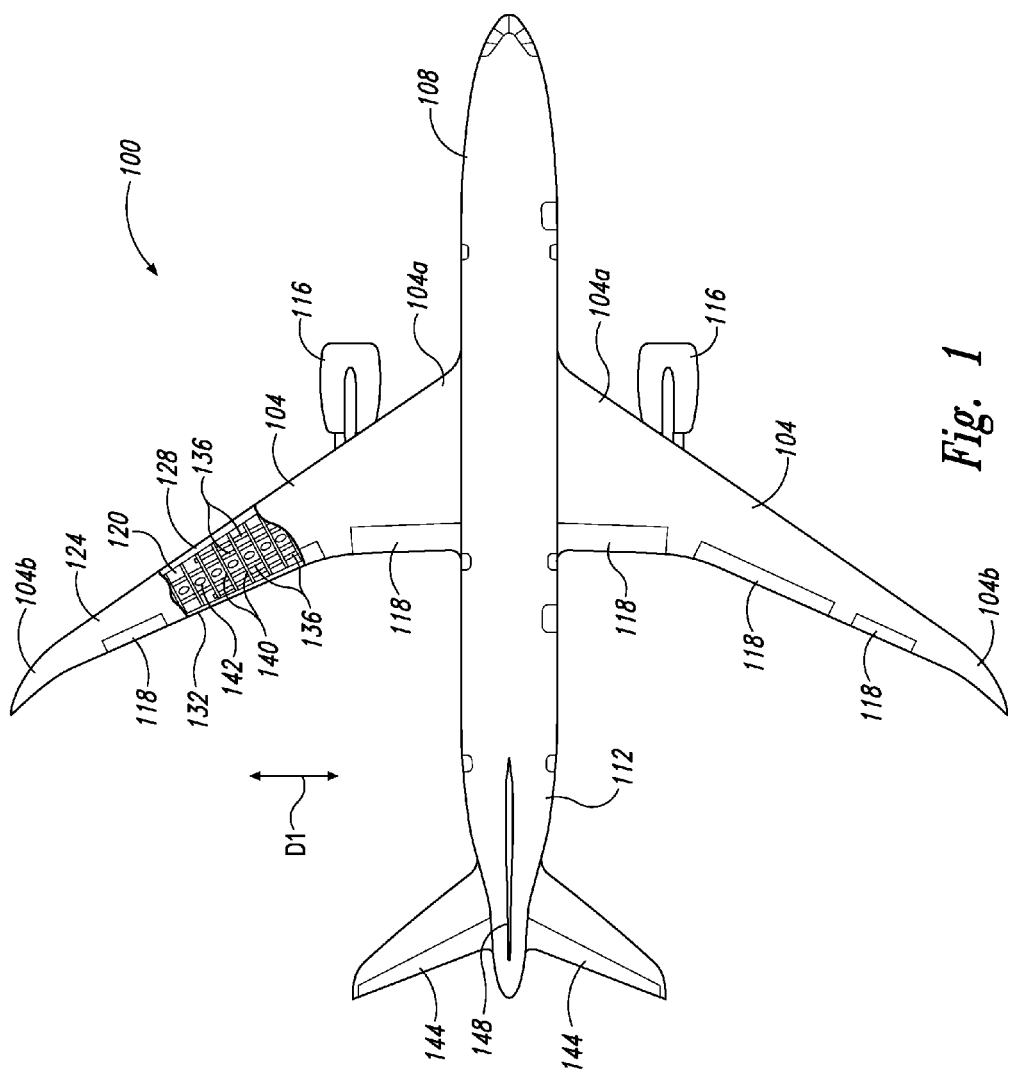
FIG. 1 is a semi-schematic top view of an aircraft with a portion of an upper wing skin removed revealing a lower wing skin, a plurality of stringers, and a plurality of ribs.

Various embodiments are described below and illustrated in the associated drawings. Unless otherwise specified, an embodiment and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar embodiments. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Disclosed herein are carbon fiber stiffeners (or stringers), with respective cross sections that may enable improved rib-to-panel interfaces. In one embodiment, the carbon fiber stiffeners may each have a cross section that is solid and trapezoidal in shape. In some embodiments, the stringers may be curved to enable a tip to tip (or tip region to tip region) curved wing. The height of each solid trapezoid stiffener may be approximately 1.5 inches, whereas pre-existing "I" or "T" shaped carbon fiber stiffeners typically have a height of approximately 3 inches. This reduced height of the solid trapezoidal stiffeners may allow for a rib-to-panel interface whereby the rib-to-stiffener mating surface is a continuous chord surface with fasteners that bolt directly through the rib mating surface (e.g., a rib flange), the solid trapezoidal stiffener, and the wing skin.

Furthermore, traditional carbon fiber stiffeners typically require multiple sub-components (e.g., charges and noodles) formed using complex tooling, whereas solid trapezoidal stiffeners disclosed herein may have a single overall shape that is built up ply by ply.

Moreover, a significant advantage of carbon fiber structure is that it enables construction of a relatively thin wing (e.g., in a vertical direction), especially near a tip of the wing. However, pre-existing carbon fiber stiffeners have cross sections (e.g., 'I' or 'T' shaped cross sections) that are substantially tall, for example, as described above. When these tall stiffeners are employed on upper and lower panels (e.g., on upper and lower wing skins), these tall stiffeners may nearly run into (e.g., contact) one another near the tip of the wing, where the wingbox is substantially thin. This leaves very little room inside the wingbox for mechanics or robots to access the outboard portion of the wingbox to perform assembly operations and routine maintenance. As a result, the upper and lower panels are typically separated when assembled by a significant distance such that adequate reach access in the wingbox can be attained. Thus, the tall height of these pre-existing carbon fiber stiffeners limits how thin the wing can be in the outboard part of the wingbox.

Examples of such pre-existing systems and methods are disclosed in the following U.S. Patents and U.S. Patent Application, which are hereby incorporated by reference in their entireties for all purposes: U.S. Pat. No. 8,763,253; U.S. Pat. No. 8,714,485; U.S. Pat. No. 8,540,921; U.S. Pat. No. 7,897,004; US20140248462; and US20120292446.

In some embodiments of the present teachings, a stiffener (e.g., a laminate composite stringer) may have a cross section (e.g., a solid trapezoidal cross section, as described above) with a height that is approximately half the height of 'I' or 'T' shaped cross sections of pre-existing carbon fiber stiffeners. This reduction in stiffener height may enable a thinner wing, as the effective separation between the upper and lower panels may be increased due to the decreased height of the trapezoidal cross section (e.g., as compared to the height of pre-existing 'I' or 'T' shaped cross sections).

In some embodiments, only one carbon fiber shape (e.g., including wing skin plies and stringer plies) may be formed and cured, which may be an improvement over pre-existing stiffener fabrication processes where, for example, four or more shapes are formed, assembled and cured. In some embodiments, tooling costs for stiffener fabrication and need for rework may be significantly reduced, for example, as a result of disclosed stiffener cross sections (e.g., solid and trapezoidal). Further, in some embodiments, disclosed stiffeners may permit more options for attaching the stiffeners to the wing skin, which may also open up manufacturing trade space (e.g., provide for increased clearance inside the wingbox).

Additionally, a laminate composite (e.g., carbon fiber) stringer (or stiffener) with a solid trapezoidal cross section, rather than a noodle charge as included in traditional stiffeners, may significantly reduce stringer disbond issues where the stiffeners terminate (e.g., run-out) and/or where the stiffeners pass through traditional ribs, which may improve stiffener load carrying capabilities. Since stringer loads are typically associated with the thickness of the wingbox, reducing disbond issues may permit a thinner wingbox with improved aerodynamic performance.

Furthermore, pre-existing ribs typically employ a relatively large number of fasteners extending through the ribs and through bases of pre-existing stiffeners to protect the associated noodles from disbond. The present teachings allow for a reduced number of fasteners, because the laminate composite stringers with solid cross sections eliminate a noodle, and therefore need less complicated fastener layout because there is no noodle to avoid when penetrating the stringer with a fastener. Such a construction may also result in (or permit) simplified rib interfaces.

For example, in one embodiment of the present teachings, an aircraft tension panel may include a plurality of single ply-by-ply built-up solid carbon fiber matrix laminate stiffeners operatively coupled to a carbon fiber matrix laminate skin. Each of the solid carbon fiber matrix laminate stiffeners may have a respective cross section that is primarily trapezoidal in shape. A rib structure may be operatively coupled to the tension panel by extending one or more mechanical fastening elements through the rib structure, through one or more of the solid carbon fiber matrix laminate stiffeners, and through the carbon fiber laminate skin. A rib interface of the tension panel may primarily be a ruled surface. In some embodiments, the stiffeners and the skin may be co-cured. In some embodiments, the stiffeners may be cured, and then the skin may be cured on the cured stiffeners (e.g., in a co-bond method). In some embodiments, the skin may be cured, and then the stiffeners may be cured on the cured skin (e.g., in a reverse co-bond method).

In another example, a wing may comprise a stringer, a spar, a rib, a wing skin, and at least one fastener. The stringer may be a laminate composite including a plurality of plies that are substantially parallel to a surface of the wing skin. The stringer may have a trapezoidal cross section, and may be structurally joined to the wing skin such that the ply adjacent to the wing skin is wider than the ply furthest from the wing skin. The stringer may pass through a passage in the rib. The passage may have a passage height that is no more than 1.5 to 2 inches from the wing skin. The passage height may be substantially the same height as a height of the trapezoidal stringer cross section. The at least one fastener may extend through a rib flange of the rib, through the stringer, and through the wing skin. In some embodiments the stringer may be continuous from the wing to an adjacent wing (e.g., extending from an opposite side of an aircraft fuselage).

Disclosed embodiments may provide a lightweight, efficient wing structure with improved ease of manufacture, and fewer parts than known wing structures using composite materials. For example, some embodiments may provide for an elimination of stringer wing-to-body joins.

Some embodiments may permit decreased cost of aircraft structure, and/or simplified fabrication requirements. For example, multiple ply formations may be used to form tension panels thereby reducing flow time. Stringers of these tensions panels may have contoured shapes that are simplified as compared to pre-existing composite material stringer configurations, thereby permitting faster material laydown methods, for example, by permitting use of broad goods (e.g., pre-preg wider than 30 cm), automatic fiber placement (AFP), net trim laminate machining (NTLM), and/or other methods such as resin infusion or thermoplastic methods.

Further, some embodiments may eliminate radius fillers, a separate base charge, and/or a need to maintain a radius during stringer layup and cure. Among other benefits, disclosed embodiments may require less rework and repair, may simplify run-out layup, may simplify rib interfaces, may provide for more convenient installation (e.g., wing assembly), and/or may reduce a number of fasteners, caps, and/or seals.

EXAMPLES, COMPONENTS, AND ALTERNATIVES

The following examples describe selected aspects of exemplary embodiments, as well as related systems and/or methods. These examples are intended for illustration and should not be interpreted as limiting the entire scope of the present disclosure. Each example may include one or more distinct inventions, and/or contextual or related information, function, and/or structure.

Example 1

This example describes an illustrative aircraft 100; see FIGS. 1-7.

Figure 2:
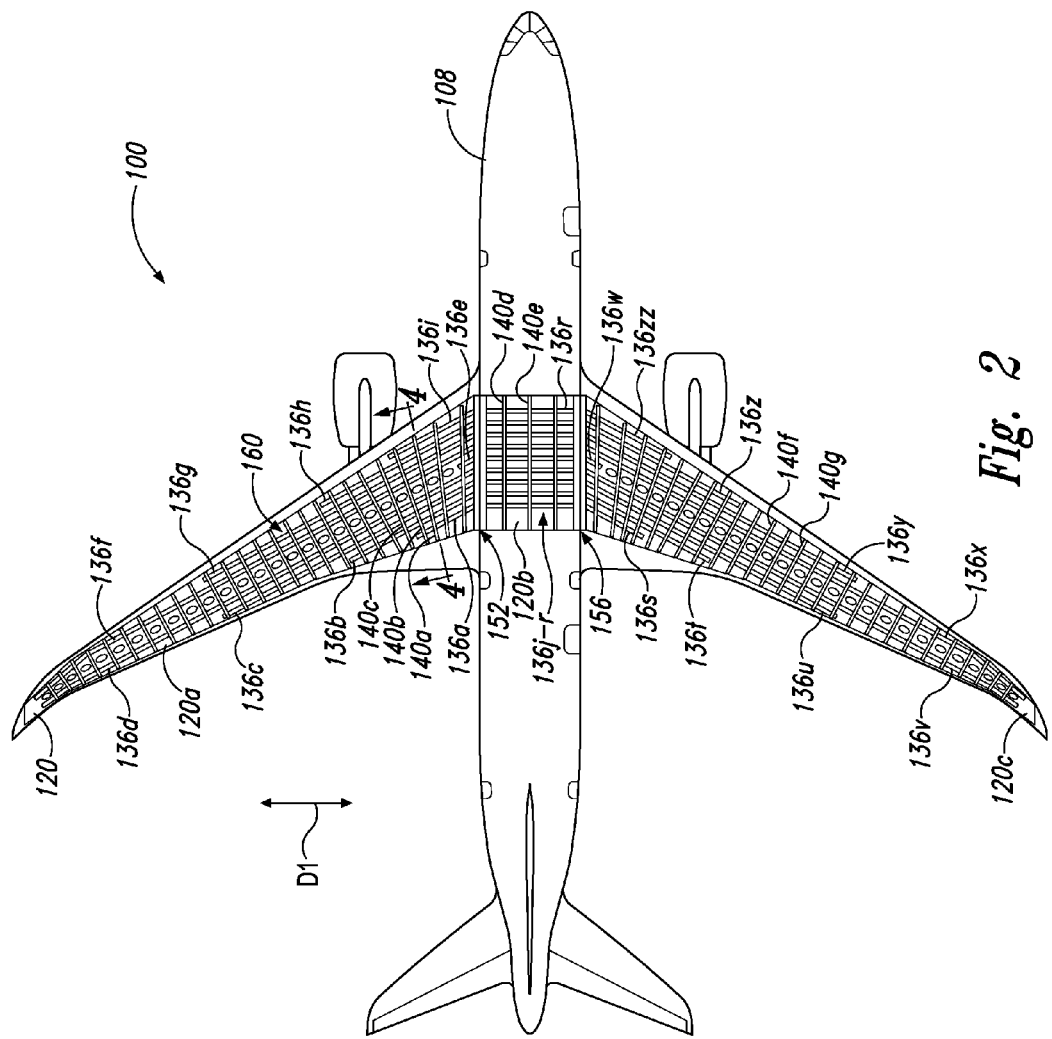
FIG. 2 is a semi-schematic top view similar to FIG. 1, but with a portion of the fuselage and a greater portion of the upper wing skin removed to show a three-piece wing embodiment.
Figure 3:
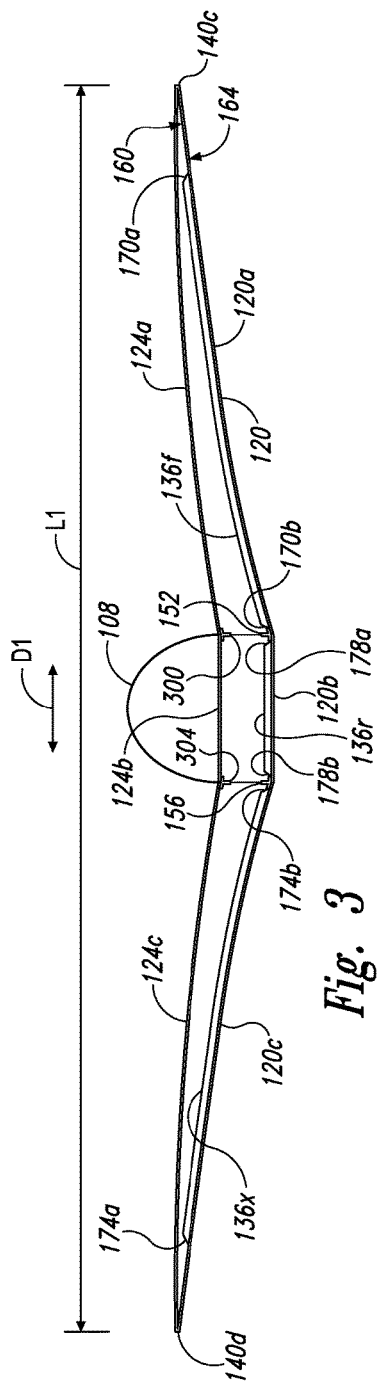
FIG. 3 is a semi-schematic cross-section of the three-piece wing embodiment taken in a plane normal to an elongate axis of the fuselage, with the ribs removed from the view.

As shown in FIG. 1, aircraft 100 may include a pair of wings 104 (e.g., in a three-piece wing embodiment configuration, as shown in FIGS. 2 and 3, or in a one-piece wing embodiment configuration, as shown in FIGS. 8-11, which will be described further below in more detail), a fuselage 108, a tail section 112, and one or more propulsion units 116.

Each of wings 104 may extend outwardly from fuselage 108 from a respective inboard portion 104a to a respective outboard portion 104b, for example, in a direction generally parallel to a span-wise direction D1 of wings 104. Wings 104 (or each of wings 104) may include control surfaces 118, a lower wing skin 120, an upper wing skin 124, a front spar 128, a rear spar 132, a plurality of stringers 136, and a plurality of ribs 140.

Figure 4:
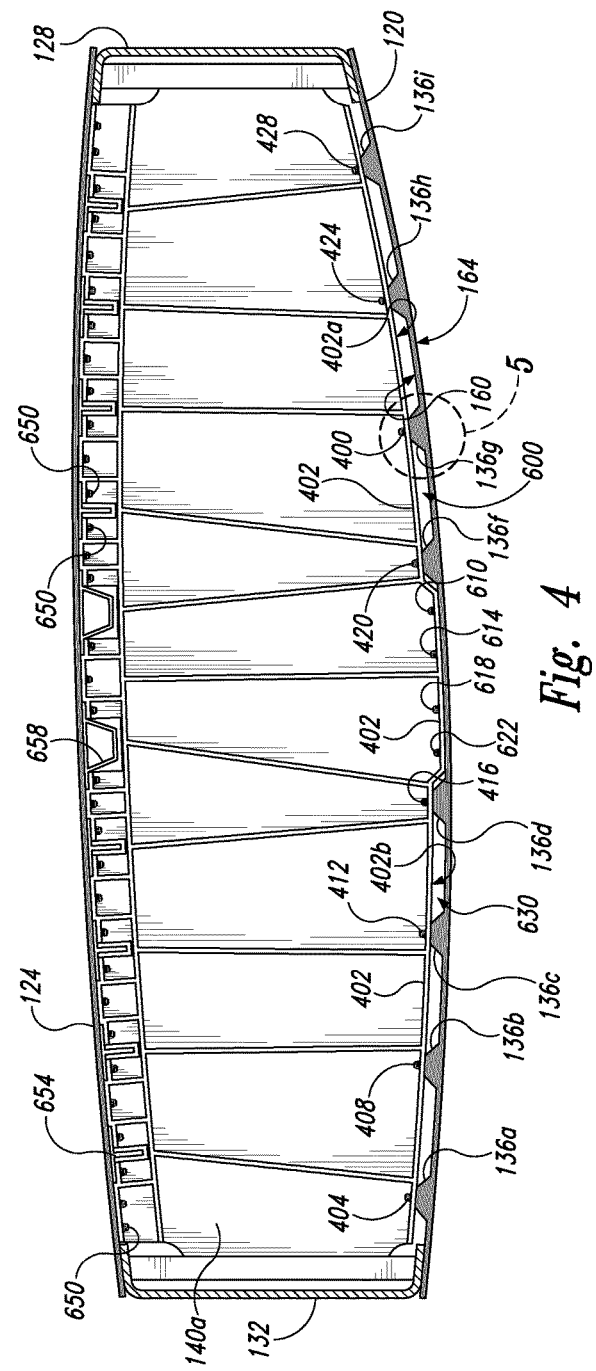
FIG. 4 is a semi-schematic cross-section of the wing taken along line 4-4 in FIG. 2 showing one of the ribs coupled to the stringers.

Stringers 136 and lower wing skin 120 (among other components of wings 104) may be made of laminate composite material including generally planar and mutually parallel plies, as will be described below in more detail. Stringers 136 may be structurally joined to lower wing skin 120, and may extend generally parallel to span-wise direction D1, as shown. Spars 128, 132 may respectively connect leading and trailing edges of skins 120, 124 to form a wingbox (as can be seen in FIG. 4) of wing 104. A plurality of ports 142 may be formed in lower wing skin 120, and configured to allow selective access to an interior of the wing box.

Ribs 140 may extend generally perpendicular to span-wise direction D1. Lower portions of ribs 140 may be coupled to stringers 136 and/or lower wing skin 120, and upper portions of ribs 140 may be coupled to upper wing skin 124, thereby stiffening the wingbox (e.g., in conjunction with stringers 136), as will also be described below in more detail.

Figure 5:
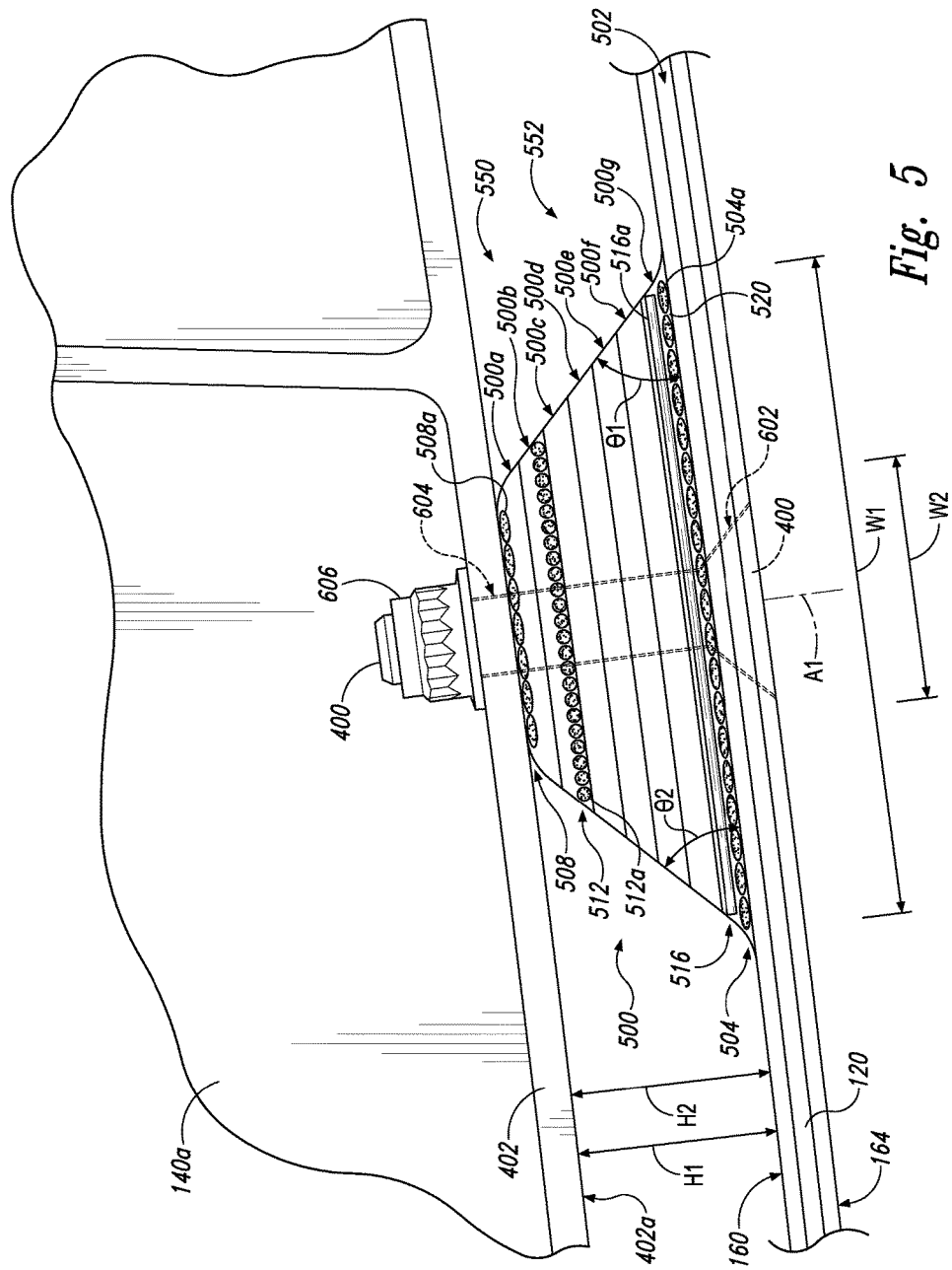
FIG. 5 is semi-schematic view of a region of FIG. 4, showing a fastener extending through the lower wing skin, through a trapezoidal cross section of one of the stringers, and through a rib flange of the rib. It should be noted that fibers of only a few plies forming the stringer are schematically depicted.

As shown, tail section 112 may include wing (or wing-like) structures, such as horizontal stabilizers 144, and a vertical stabilizer 148. In some embodiments, one or more stringers, similar to stringers 136, such as a plank stringer, may be structurally joined to an interior surface of a skin of either of stabilizers 144, 148 (e.g., or to a tension panel of an aircraft empennage if so included). For example, laminate composite stringers having respective solid trapezoidal cross sections (e.g., similar to what is shown in FIG. 5, which will be described below in more detail) may be structurally joined to an interior surface of an upper wing skin of horizontal stabilizers 144, and coupled to one or more associated ribs. In some embodiments, one or more stringers, similar to stringers 136, may be structurally joined to a tension panel of a torque box associated with a respective control surface 118.

FIG. 2 shows an illustrative configuration of stringers 136 and ribs 140 in one example of the three-piece wing embodiment. As shown, lower wing skin 120 may include a starboard-side portion 120a, a central portion 120b, and a port-side portion 120c. Starboard-side portion 120a may be connected to central portion 120b by a first side-of-body joint 152 (e.g., and a plurality of fasteners). Port-side portion 120c may be connected to an opposite side of central portion 120b by a second side-of-body joint 156. While joints 152, 156 are shown as being generally aligned with lateral sides of fuselage 108, in other embodiments, these joints may be located in other suitable locations, such as outboard of the respective lateral sides of fuselage 108.

In the embodiment shown, nine of stringers 136, namely stringers 136a-i, extend along portion 120a. Similarly, nine of stringers 136, namely stringers 136j-r (e.g., collectively generally indicated here), may extend along portion 120b and may be generally aligned respectively with inboard portions of stringers 136a-i. Similarly, nine of stringers 136, namely stringers 136s-z and 136zz, may extend along portion 120c. As shown, inboard portions of stringers 136s-z, 136zz may be generally aligned respectively with stringers 136j-r.

A plurality of ribs 140, a few of which are indicated respectively at 140a, 140b, 140c, may be positioned adjacent portion 120a. Similarly, other pluralities of ribs 140, a few of which are indicated respectively at 140d, 140e, 140f, 140g, may be positioned adjacent respective portions 120b, 120c, as shown.

More specifically, as can be seen in FIGS. 2 and 3, lower wing skin 120 may have an interior surface 160 (see FIG. 2) and an opposite exterior surface 164 (see FIG. 3). Exterior surface 164 may define a lower exterior surface of wing 104. Interior surface 160 may have a length L1 (see FIG. 3) extending generally parallel to span-wise direction D1. Each of stringers 136 may be a laminate composite stringer. A majority of each laminate composite stringer may be characterized by a stacked plurality of generally planar plies of reinforcement material (e.g., which will be described below in more detail with reference to FIG. 5). Each stacked plurality of generally planar plies may be structurally joined as a stack to interior surface 160, and may extend generally parallel to interior surface 160 and to span-wise direction D1 along a substantial portion of interior surface 160 (e.g., along a substantial portion of length L1). As such, stringers 136 may resemble (and/or be referred to as) planks.

For example, as can be seen in FIG. 2 with reference to FIG. 3, stringers 136c, 136d, 136f, 136g may extend along a majority of interior surface 160 associated with starboard-side portion 120a of lower wing skin 120. Similarly, stringers 136u, 136v, 136x, 136y may extend along a majority of interior surface 160 associated with port-side portion 120c of lower wing skin 120. Further, each of stringers 136j-r may extend along a majority of interior surface 160 associated with central portion 120b of lower wing skin 120.

Run-out ends of each of stringers 136 may have a thickness that is tapered toward interior surface 160, which may improve the integrity of the associated stack of structurally joined reinforcement material. For example, as shown in FIG. 3, stringer 136f may have opposing run-out ends 170a, 170b. End 170a may be disposed near a first wing tip 104c of wing 104 (e.g., of starboard-side wing 104), and may have a thickness that tapers toward surface 160 in a direction away from end 170b, as shown. End 170b may be disposed near joint 152, and may have a thickness that tapers toward surface 160 in a direction away from end 170a.

Similarly, stringer 136x may have opposing run-out ends 174a, 174b. End 174a may be disposed near a second wing tip 104d (e.g., opposite wing tip 104c) of wing 104 (e.g., of port-side wing 104), and may have a thickness that tapers toward surface 160 in a direction away from end 174b, as shown. End 174b may be disposed near joint 156, and may have a thickness that tapers toward surface 160 in a direction away from end 174a. As also shown, stringer 136r may have opposing run-out ends 178a, 178b that are respectively disposed near joints 152, 156 and have respective thicknesses that taper toward interior surface 160 associated with central portion 120b of lower wing skin 120.

As also shown in FIG. 3, upper wing skin 124 may include starboard-side, central, and port-side portions 124a, 124b, 124c, in a manner similar to portions 120a-c of lower wing skin 120. For example, portion 124a may be connected to one side of central portion 124b by a third side-of-body joint 300, and portion 124c may be connected to an opposite side of central portion 124b by a fourth side-of-body joint 304. Further, portion 124a may be connected to portion 120a at (or proximal) wing tip 104c, and portion 124c may be connected to portion 120c at (or proximal) wing tip 104d.

It should be noted that ribs 140 are not shown in FIG. 3 to simplify illustration of the extension of stringers 136. However, in FIGS. 4 and 5, rib 140a is shown coupled to stringers 136. In particular, FIG. 4 is a cross-section of the wingbox (e.g., including lower wing skin 120, upper wing skin 124, and front and rear spars 128, 132) taken along line 4-4 in FIG. 2. As shown, stringers 136a-d, 136f-i may be joined to lower wing skin 120. Rib 140a may extend generally perpendicular to stringers 136a-d, 136f-i, and may be positioned adjacent interior surface 160 and opposite lower wing skin 120 relative to stringers 136a-d, 136f-i.

A fastener 400, such as a bolt or other suitable mechanical fastening device, may extend through lower wing skin 120, through stringer 136g, and into rib 140a (e.g., through a rib flange 402 of rib 104a). Similarly, fasteners 404, 408, 412, 416, 420, 424, 428 may extend through skin 120, through respective stringers 136a, 136b, 136c, 136d, 136f, 136h, 136i, and into rib 140a (e.g., through rib flange 402). Though rib flange 402 is shown as being continuous between adjacent stringers 136, in some embodiments the rib flange may not be continuous, but rather include adjacent portions through which the fasteners may respectively extend.

More specifically, in the example shown, fasteners 400, 404, 408, 412, 416, 420, 424, 428 may extend through a solid trapezoidal cross section of the respective stringer. As also shown, each of these cross sections may extend in a plane (e.g., parallel to the view of FIG. 4) that is substantially parallel to and (substantially and/or generally) aligned with rib 140a. A majority of each of these solid trapezoidal cross sections may be characterized by a respective stack of generally planar plies of reinforcement material structurally joined together and to lower wing skin 120 by matrix material, for example, in a manner similar to stringer 136*g*, which will now be described in more detail.

In particular, FIG. 5 shows a more detailed view of region 5 in FIG. 4, in which a stacked plurality of generally planar plies of reinforcement material (e.g., as described above, and schematically shown here), generally indicated at 500, and forming stringer 136*g*, can be seen. Fibers of a few plies are schematically shown here (e.g., and exaggerated in dimension) to simplify illustration. Each of plies 500 (e.g., fibers in each of the plies) may be locally parallel to lower exterior surface 164 of wing 104. For example, plies 500 may include a plurality of subsets of plies, such as subsets 500*a-g*. The plies in each of subsets 500*a-g* may extend generally parallel to one another, to wing skin 120 (e.g., to a local portion of interior surface 160, and/or to a local portion of exterior surface 164), and/or to the plies of the other subsets of plies 500.

As shown, a majority of stringer 136*g* may be characterized by plies 500. As mentioned, plies 500 may extend generally parallel to interior surface 160 and span-wise direction D1 (see FIGS. 2 and 3) along a substantial portion of interior surface 160. In some embodiments, one or more of plies 500 may not be continuous along an entire extension of stringer 136*g*. For example, a layer in which a ply may be disposed may include multiple plies (directly) adjacent thereto and/or generally co-planar therewith.

In some embodiments, a number of plies in stacked plurality of plies 500 and disposed in the trapezoidal cross section of stringer 136*g* may be in a range of about 100 to 200 plies. For example, each of subsets 500*a-g* may include a number of plies in a range of about 1 to about 30 plies. Such a range of plies (e.g., in conjunction with a number of plies 502 of skin 120, which may include about 25 to 45 plies) may be suitable for being co-cured with one another, as will be described further below in more detail. For example, as described above, lower wing skin 120 may be a laminate composite including plies 502, which may be a plurality of generally parallel plies of reinforcement material. For example, in the embodiment shown, there may be approximately 160 plies in the cross section of stringer 136*g*, and approximately 36 plies in the cross section of skin 120.

However, to simplify the illustration (e.g., as mentioned above), fibers of only a few plies of plies 500 are schematically depicted in FIG. 5, namely fibers 504*a*, 508*a*, 512*a*, 516*a* of respective plies 504, 508, 512, 516 of stacked plurality of plies 500. The fibers of plies 500 may be carbon fibers, or any other suitable reinforcement material. As shown in FIG. 5, stringer 136*g* (e.g., composed of plies 500 and forming a plank-like structure extending generally parallel to span-wise direction D1—see FIG. 2) has a generally solid trapezoidal cross section when viewed in a plane that is generally perpendicular to span-wise direction D1, such that first ply 504 proximal interior surface 160 has a width W1 that is wider than a width W2 of second ply 508 that is further from interior surface 160 than first ply 504. Widths W1, W2 may be any suitable dimension. For example, width W1 may be in a range of approximately 3 inches to 5 inches, and width W2 may be in a range of approximately 2 inches to 4 inches.

As shown, the cross section of stringer 136*g* (e.g., a majority of which may be composed of fibers of plies 500) may be generally tapered and solid, with a width that decreases as measured locally parallel to lower exterior surface 164, when progressing from adjacent lower wing skin 120 to adjacent rib 140*a*.

In contrast to a hat stringer, which is generally hollow, plies 500 may fill a substantial portion of the solid trapezoidal cross section of stringer 136*g*. For example, plies 500 (e.g., fibers thereof) may fill a majority of the cross section, or all of the cross section, for example, in conjunction with matrix material 520, which may structurally join plies 500 to one another and to plies 502 of skin 120. For example, matrix material 520 may be a polymer, such as a polymer resin, that when cured may structurally join together plies 500 (and lower wing skin 120). In some embodiments, plies 500 and/or the plies of skin 120 may be pre-impregnated with matrix material 520 (e.g., these plies may be 'prepreg'), which may provide for improved lay down and curing procedures, which will be described further below in more detail with reference to FIGS. 13-15. In some embodiments, plies 500 may include resin infused dry fiber, thermoplastic, the like, and/or any suitable combination thereof.

In particular, as schematically depicted here in FIG. 5, plies 500 may include (or be) a plurality of layers of tape (e.g., prepreg tape) arranged, with respect to an axis A1 of the trapezoidal cross section of stringer 136*g*, at plurality of different angles, such as approximate angles of 0 degrees, −30 degrees, −45 degrees, −60 degrees, 90 degrees, 60 degrees, 45 degrees, 30 degrees, and/or any other suitable angle and/or laminate mix. As shown, axis A1 may be locally perpendicular (e.g., normal) to exterior surface 164. An approximate zero (0) degree arrangement may correspond to fibers in the associated layer of tape extending generally parallel to span-wise direction D1 (e.g., in a direction normal to the view of FIG. 5). For example, ply 504 may be a layer of tape arranged at approximately 45 degrees such that fibers 504*a* of ply 504 extend generally leftward into the view of FIG. 5, thereby forming respective angles of approximately 45 degrees with the plane of the view. Similarly, fibers 508*a* of ply 508 may be arranged at approximate angles of −45 degrees (e.g., extending generally rightward into the view of FIG. 5). Fibers 512*a* of ply 512 may be arranged at approximate angles of 0 degrees, thereby extending approximately in a direction normal to the view of FIG. 5. Fibers 516*a* of ply 516 may be arranged at approximate angles of 90 degrees, thereby extending generally perpendicular to span-wise direction D1, and axis A1.

As mentioned above, stacked plurality of plies 500 forming stringer (or plank, or plank stringer) 136*g*, may include a relatively large number of plies, such as about 160 plies. Listed below in Table 1 is an example of such a configuration. It should be understood that ply counts and orientations in Table 1 (and the other ply tables disclosed herein) are merely exemplary and that other configurations, laminate mixes, numbers of plies, and/or orientations are possible.

TABLE 1

| Ply | Orientation |
| --- | --- |
| P1 | 45 |
| P2 | 90 |
| P3 | −45 |
| P4 | 0 |
| P5 | 0 |
| P6 | 45 |
| P7 | 0 |
| P8 | 0 |
| P9 | −45 |
| P10 | 0 |
| P11 | 0 |
| P12 | 45 |
| P13 | 90 |
| P14 | −45 |

TABLE 1-continued

| Ply | Orientation |
|---|---|
| P15 | 0 |
| P16 | 0 |
| P17 | 45 |
| P18 | 0 |
| P19 | 0 |
| P20 | −45 |
| P21 | 0 |
| P22 | 0 |
| P23 | 45 |
| P24 | 90 |
| P25 | −45 |
| P26 | 0 |
| P27 | 0 |
| P28 | 45 |
| P29 | 0 |
| P30 | 0 |
| P31 | −45 |
| P32 | 0 |
| P33 | 0 |
| P34 | 45 |
| P35 | 90 |
| P36 | −45 |
| P37 | 0 |
| P38 | 0 |
| P39 | 45 |
| P40 | 0 |
| P41 | 0 |
| P42 | −45 |
| P43 | 0 |
| P44 | 0 |
| P45 | 45 |
| P46 | 90 |
| P47 | −45 |
| P48 | 0 |
| P49 | 0 |
| P50 | 45 |
| P51 | 0 |
| P52 | 0 |
| P53 | −45 |
| P54 | 0 |
| P55 | 0 |
| P56 | 45 |
| P57 | 90 |
| P58 | −45 |
| P59 | 0 |
| P60 | 0 |
| P61 | 45 |
| P62 | 0 |
| P63 | 0 |
| P64 | −45 |
| P65 | 0 |
| P66 | 0 |
| P67 | 45 |
| P68 | 90 |
| P69 | −45 |
| P70 | 0 |
| P71 | 0 |
| P72 | 45 |
| P73 | 0 |
| P74 | 0 |
| P75 | −45 |
| P76 | 0 |
| P77 | 0 |
| P78 | 45 |
| P79 | 90 |
| P80 | −45 |
| P81 | 0 |
| P82 | 0 |
| P83 | 45 |
| P84 | 0 |
| P85 | 0 |
| P86 | −45 |
| P87 | 0 |
| P88 | 0 |
| P89 | 45 |
| P90 | 90 |
| P91 | −45 |
| P92 | 0 |
| P93 | 0 |
| P94 | 45 |
| P95 | 0 |
| P96 | 0 |
| P97 | −45 |
| P98 | 0 |
| P99 | 0 |
| P100 | 45 |
| P101 | 90 |
| P102 | −45 |
| P103 | 0 |
| P104 | 0 |
| P105 | 45 |
| P106 | 0 |
| P107 | 0 |
| P108 | −45 |
| P109 | 0 |
| P110 | 0 |
| P111 | 45 |
| P112 | 90 |
| P113 | −45 |
| P114 | 0 |
| P115 | 0 |
| P116 | 45 |
| P117 | 0 |
| P118 | 0 |
| P119 | −45 |
| P120 | 0 |
| P121 | 0 |
| P122 | 45 |
| P123 | 90 |
| P124 | −45 |
| P125 | 0 |
| P126 | 0 |
| P127 | 45 |
| P128 | 0 |
| P129 | 0 |
| P130 | −45 |
| P131 | 0 |
| P132 | 0 |
| P133 | 45 |
| P134 | 90 |
| P135 | −45 |
| P136 | 0 |
| P137 | 0 |
| P138 | 45 |
| P139 | 0 |
| P140 | 0 |
| P141 | −45 |
| P142 | 0 |
| P143 | 0 |
| P144 | 45 |
| P145 | 90 |
| P146 | −45 |
| P147 | 0 |
| P148 | 0 |
| P149 | 45 |
| P150 | 0 |
| P151 | 0 |
| P152 | −45 |
| P153 | 0 |
| P154 | 45 |
| P155 | 0 |
| P156 | −45 |
| P157 | 0 |
| P158 | 45 |
| P159 | 90 |
| P160 | −45 |
| P161 | 0/90 |

In particular, ply P1 listed in Table 1 may correspond to a ply adjacent interior surface 160, such as ply 504, and ply P160 listed in Table 1 may correspond to a ply of stacked plurality of plies 500 that is generally parallel to and furthest from interior surface 160, with plies P2-P159 being serially disposed there between. The orientation column in Table 1 may correspond to an approximate tape arrangement of fibers of the associated ply. For example, ply P1 may have fibers arranged with respect to axis A1 at angles of approximately 45 degrees, while ply P161, which may be an optional fabric overwrap layer extending over plies 500, extending over (or included in) interior surface 160, and/or extending over the stacked plurality of plies of one or more of the other stringers of plurality of stringers 136, may have fibers arranged at respective angles of approximately 0 degrees and 90 degrees with respect to axis A1 (and/or another axis locally perpendicular to interior surface 160 of an associated area of skin 120).

For example, plies P1-P29 may be included in subset 500g. Plies P30-P51 may be included in subset 500f. Plies P52-P73 may be included in subset 500e. Plies P74-P95 may be included in subset 500d. Plies P96-P117 may be included in subset 500c. Plies P118-P139 may be included in subset 500b. Plies P140-P160 may be included in subset 500a. In some embodiments, plies P1-P160 may each be a pre-impregnated thermoset composite, such as a toughened-epoxy polymeric matrix pre-impregnated into continuous carbon fiber unidirectional tape or woven carbon fiber fabric. In some embodiments, one or more plank stiffeners or stringers, such as stringer 136g, may be constructed with other types of carbon fiber (or other reinforcement fiber) composites. One alternative is thermoplastic carbon fiber composites, which may be constructed from continuous carbon fibers, impregnated with a thermoplastic polymer, such as polyether ketone ketone (PEKK-FC), in unidirectional tape or woven fabric form. Another alternative is dry carbon fiber resin infused thermoset tape and/or fabric, which may be constructed from continuous carbon fibers laid up in dry tape or fabric form, injected with epoxy polymeric matrix material, and then cured. Ply P161 may be a fabric overwrap layer, which may be pre-impregnated with thermoset or thermoplastic matrix material or subsequently infused with thermoset or thermoplastic matrix material, or may be another other suitable composite material.

Returning to FIG. 5, the trapezoidal cross section of stringer 136g may include an upper portion 550 and a lower portion 552. As shown, lower portion 552 may be disposed between upper portion 550 and interior surface 160. In some embodiments, upper portion 550 and lower portion 552 may include approximately the same number of plies (e.g., layers of tape). For example, upper portion 550 may include subsets 500a-c and an upper portion of subset 500d. Lower portion 552 may include subsets 500e-g and a lower portion of subset 500d. For example, lower portion 552 may include plies P1-P80, and upper portion 550 may include plies P81-P160. As can be seen with reference to Table 1, upper and lower portions may include an approximately equal percentage of layers of tape arranged at approximate angles of 0 degrees, with both portions including more 0 degree orientation plies (e.g., layers of tape) than other degree orientation plies. Such a configuration may result in stringer 136g having a restorative force characteristic of approximately 30 kips/inch, or other suitable level. Further, such a configuration may improve a structural performance of stringer 136g, for example, as compared to a hat stringer or a blade stringer, such as an 'I' or 'T' shaped stringer. For example, hat stringers are typically formed with complex generally hollow wrap shapes, typically requiring the same laminate mix through the corresponding shape. Similarly, blade stringers are typically formed with components forming right angles with one another, which also typically involves formation with the same laminate mix throughout the corresponding shape.

Further, as can also be seen with reference to Table 1, upper and lower portions 550, 552 may each include layers of tape arrange at approximate angles of 0 degrees, negative (−) 45 degrees, 90 degrees, and 45 degrees. In some embodiments, upper and/or lower portions 550, 552 may include other suitable laminate mixes or ply orientations, such as one or more layers of tape arranged at approximate angles of +/−30 degrees, +/−60 degrees, and/or any other suitable angle.

With stringer 136g, more zero-degree plies (e.g., approximately 0 degree arranged tape) may be biased toward a top of stringer 136g (e.g., opposite interior surface 160). For example, a greater percentage of layers of tape may be arranged at an approximate angle of 0 degrees in upper portion 550 of the trapezoidal cross section of stringer 136g than in lower portion 552 of the trapezoidal cross section of stringer 136g. Such a configuration may enhance a structural capability of stringer 136g, for example, when reacting to loads exerted on wing 104. For example, 0 degree plies tend to provide greater stiffening in a primary loading direction of wing 104, and by putting more of these plies in upper portion 550, a cross section moment of inertia of stringer 136g may be effectively raised, thereby enhancing the structural capability of stringer 136g. An example of such an arrangement is shown in Table 2 below, where plies P1-P160 may be disposed in the trapezoidal cross section of stringer 136g, as described above.

TABLE 2

| Ply | Orientation |
|---|---|
| P1 | 0 |
| P2 | 45 |
| P3 | −45 |
| P4 | 0 |
| P5 | 45 |
| P6 | 90 |
| P7 | −45 |
| P8 | 0 |
| P9 | 45 |
| P10 | 0 |
| P11 | −45 |
| P12 | 45 |
| P13 | 0 |
| P14 | −45 |
| P15 | 0 |
| P16 | 45 |
| P17 | 90 |
| P18 | −45 |
| P19 | 0 |
| P20 | 45 |
| P21 | −45 |
| P22 | 0 |
| P23 | 0 |
| P24 | −45 |
| P25 | 45 |
| P26 | 0 |
| P27 | −45 |
| P28 | 90 |
| P29 | 45 |
| P30 | 0 |
| P31 | −45 |
| P32 | 0 |
| P33 | 45 |
| P34 | −45 |
| P35 | 0 |
| P36 | 45 |
| P37 | 0 |
| P38 | −45 |
| P39 | 90 |
| P40 | 45 |
| P41 | 0 |
| P42 | −45 |
| P43 | 45 |

TABLE 2-continued

| Ply | Orientation |
|---|---|
| P44 | 0 |
| P45 | 0 |
| P46 | -45 |
| P47 | 0 |
| P48 | 0 |
| P49 | 45 |
| P50 | 90 |
| P51 | -45 |
| P52 | 0 |
| P53 | 45 |
| P54 | 0 |
| P55 | -45 |
| P56 | 45 |
| P57 | 0 |
| P58 | -45 |
| P59 | 0 |
| P60 | 45 |
| P61 | 90 |
| P62 | -45 |
| P63 | 0 |
| P64 | 0 |
| P65 | 45 |
| P66 | 0 |
| P67 | 0 |
| P68 | 45 |
| P69 | 0 |
| P70 | 0 |
| P71 | -45 |
| P72 | 90 |
| P73 | 45 |
| P74 | 0 |
| P75 | -45 |
| P76 | 0 |
| P77 | 45 |
| P78 | -45 |
| P79 | 0 |
| P80 | 45 |
| P81 | 0 |
| P82 | -45 |
| P83 | 90 |
| P84 | 45 |
| P85 | 0 |
| P86 | 0 |
| P87 | -45 |
| P88 | 0 |
| P89 | 0 |
| P90 | 45 |
| P91 | 0 |
| P92 | 0 |
| P93 | -45 |
| P94 | 90 |
| P95 | 45 |
| P96 | 0 |
| P97 | 0 |
| P98 | -45 |
| P99 | 0 |
| P100 | 0 |
| P101 | 45 |
| P102 | 0 |
| P103 | 0 |
| P104 | -45 |
| P105 | 90 |
| P106 | 45 |
| P107 | 0 |
| P108 | 0 |
| P109 | -45 |
| P110 | 0 |
| P111 | 0 |
| P112 | -45 |
| P113 | 0 |
| P114 | 0 |
| P115 | 45 |
| P116 | 90 |
| P117 | -45 |
| P118 | 0 |
| P119 | 0 |
| P120 | 45 |
| P121 | 0 |
| P122 | 0 |
| P123 | -45 |
| P124 | 0 |
| P125 | 0 |
| P126 | 45 |
| P127 | 90 |
| P128 | -45 |
| P129 | 0 |
| P130 | 0 |
| P131 | 45 |
| P132 | 0 |
| P133 | 0 |
| P134 | 0 |
| P135 | 0 |
| P136 | -45 |
| P137 | 90 |
| P138 | 45 |
| P139 | 0 |
| P140 | 0 |
| P141 | 0 |
| P142 | -45 |
| P143 | 0 |
| P144 | 0 |
| P145 | 0 |
| P146 | 45 |
| P147 | 90 |
| P148 | 45 |
| P149 | 0 |
| P150 | 0 |
| P151 | 0 |
| P152 | -45 |
| P153 | 0 |
| P154 | 0 |
| P155 | 0 |
| P156 | 45 |
| P157 | 90 |
| P158 | -45 |
| P159 | 0 |
| P160 | 0 |
| P161 | 0 |

Similarly, one or more of the other stingers of plurality of stringers 136 may have a greater percentage of layers of tape arranged at an angle of approximately 0 degrees in an upper portion of the associated cross section than in a lower portion of the associated cross section.

As can be seen in FIG. 5, opposing lateral side of the trapezoidal cross section of stringer 136g may form respective angles θ1, θ2 with a local portion of interior surface 160 (e.g., and a local portion of exterior surface 164). For example, each of these angles may be in a range of about 15 degrees to 60 degrees, which may provide for an improved rollover moment for stringer 136g and/or improved structural integrity of stringer 136g. For example, each of angles θ1, θ2 may be approximately 45 degrees, as shown. As can be seen in FIG. 4, other trapezoidal cross sections of other stringers of plurality of stringers 136 may similarly have respective lateral sides that form similar respective angles with respective local portions of lower wing skin 120.

Figure 6:
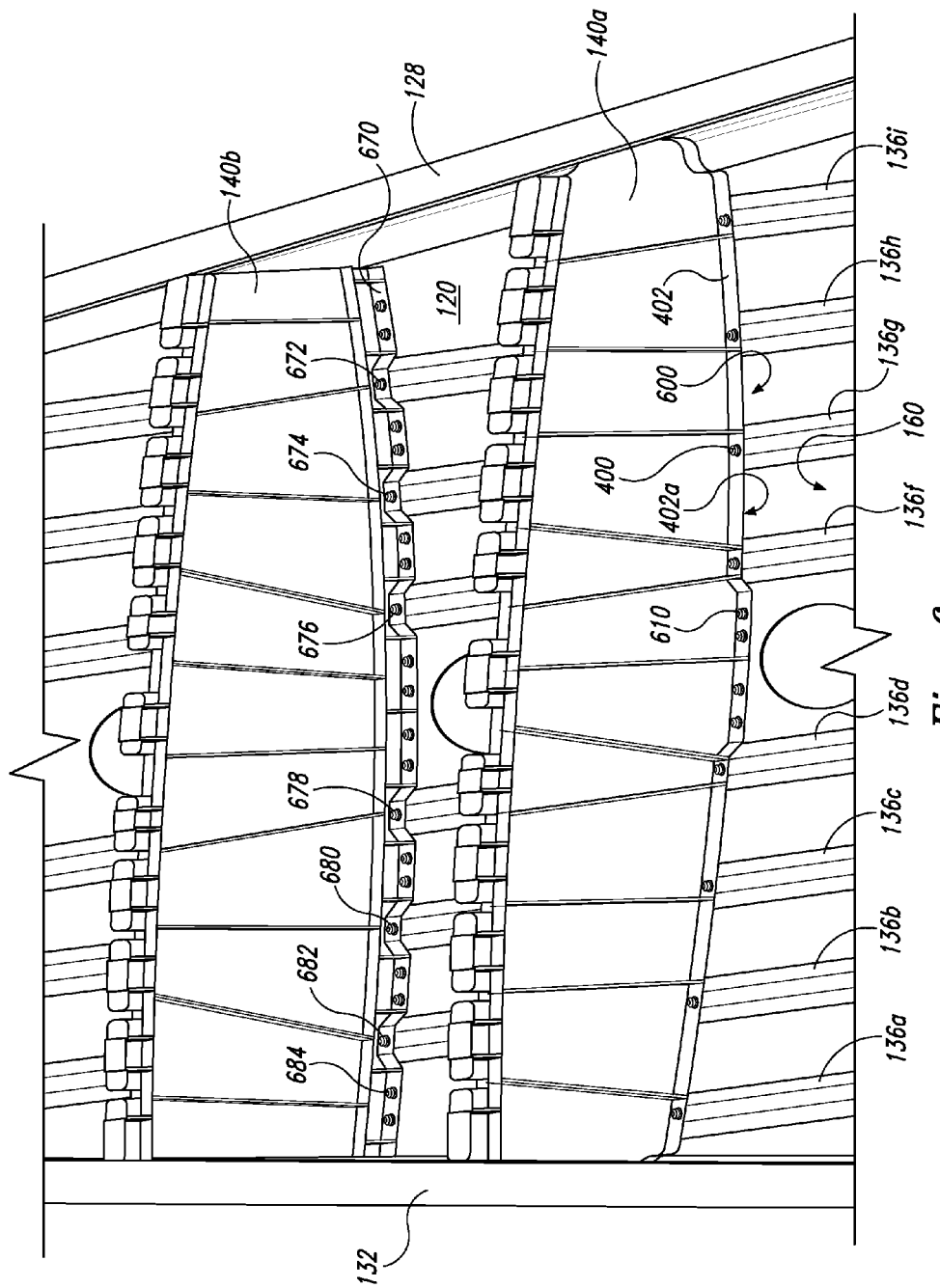
FIG. 6 is a perspective view showing the rib of FIG. 4 and an additional rib coupled to the plurality of stringers.

As shown in FIGS. 4-6, rib 140a (e.g., rib flange 402 thereof) may be shaped to define a passageway 600 between rib flange 402 and interior surface 160. Stringer 136g may pass (or extend) through passageway 600 such that the trapezoidal cross section (e.g., an upper surface thereof) may be interfaced with rib flange 402, as can be seen particularly well in FIG. 5. Such a configuration may permit an improved rib-to-stringer interface, as mentioned above. For example, an aperture 602 may be formed in lower wing skin 120, and may extend through stringer 136g. Another aperture 604 may be formed in rib flange 402, and may be align-able with aperture 602. Fastener 400 may be extended through aligned apertures 602, 604, such that a head portion of fastener 400 presses upward against wing skin 120, and a distal end of fastener 400 protrudes through rib flange 402 opposite wing skin 120, as shown. A nut 606 may be threaded onto the distal end of fastener 400, thereby drawing the distal end of fastener 400 upward and coupling rib flange 402 to the upper surface of the trapezoidal cross section of stringer 136g. However, in other embodiments, other fastening devices, apparatuses, and/or mechanisms may be used.

Other stingers of plurality of stringers 136 may be similarly interfaced with rib 140a (and/or other associated ribs). For example, stringers 136a-d, 136f, 136h, 136i may extend adjacent stringer 136g (e.g., along a substantial portion of interior surface 160—see FIG. 3). As can be seen in FIG. 5, rib flange 402 may have a generally ruled lower surface 402a. Surface 402a may be interfaced with a first subset of stringers 136a-d, 136f, 136h, 136i (e.g., stringers 136f, 136h, 136i) in addition to stringer 136g such that a majority of interior surface 160 directly below surface 402a does not contact surface 402a. Rather, the majority of interior surface 160 directly below surface 402a may be separated from surface 402a by a height H1 (see FIG. 5) of passageway 600. For example, height H1 may extend from rib flange 402 (e.g., surface 402a) to interior surface 160. The trapezoidal cross section of stringer 136g (e.g., as well as the other trapezoidal cross sections of the other stringers extending through passageway 600) may have a height H2 extending in a direction locally normal to interior surface 160. Height H1 of passageway 600 may be substantially the same height as height H2 of the trapezoidal cross section of stringer 136g (and/or of the trapezoidal cross sections of the other stringers).

In some embodiments, height H1 of passageway 600 may extend no more than two inches from interior surface 160 in the direction locally normal to interior surface 160. Such a configuration may be permitted by height H2 being substantially less than that of pre-existing composite material stringers (e.g., 'I' or 'T' shaped stringers). For example, height H2 may be approximately 1 to 2 inches. For example, height H2 may be approximately 1.211 inches, with stringer 136g including approximately 160 plies in the associated trapezoidal cross section, with each ply having a thickness of approximately 0.00757 inches. The trapezoidal cross section of stringer 136g may have a base width (e.g., width W1) that is approximately 2 to 5 inches (e.g., approximately 3.9375 inches), and a top width (e.g., width W2) that is approximately 0.9 to 2 inches (e.g., approximately 1.5 inches). Accordingly, height H1 may be (slightly greater than) approximately 1.211 inches. However, stringers (and/or associated passageways) according to the present teachings, may have other suitable heights and widths.

As can also be seen in FIG. 4, rib 140a (e.g., rib flange 402 thereof) may contact lower wing skin 120 between stringer 136g and a second subset of stringers 136a-d, 136f, 136h, 136i (e.g., stringers 136a-d). In particular, rib flange 402 may contact a portion of interior surface 160 between stringers 136d, 136f. Rib flange 402 contacting wing skin 120 may be attached to wing skin 120 by one or more fasteners, such as fasteners 610, 614, 618, 622. For example, fasteners 604, 608, 612, 616 may extend through wing lower wing skin 120 and through rib 140a (e.g., through rib flange 402). As also shown, the second subset of stringers, namely stringers 136a-d, may pass through a second passageway 630. Passageway 630 may be structured in a manner similar to passageway 600. For example a second generally ruled lower surface 402b of rib flange 402 may be shaped to define passageway 630 between surface 402b and interior surface 160 in a region near stringers 136a-d.

FIG. 4 shows an upper portion of rib 140a coupled to upper wing skin 124 (e.g., a laminate composite wing skin), by a plurality of fasteners, a few of which are indicated at 650. Upper wing skin 124 may be stiffened by one or more T-stringers, such as T-stringer 654, and one or more hat stringers, such as hat stringer 658. However, laminate composite structures of these elements may not permit direct attachment of rib fasteners from portions of these elements distal upper wing skin 124, as described above. In some embodiments, one or more stringers similar in structure to stringer 136g may be structurally joined to upper wing skin 124, thereby permitting direct attachment to the upper portion of rib 140a.

In some embodiments, other ribs of plurality of ribs 140 may be closely conformed to lower wing skin 120 (e.g., and upper wing skin 124). Pairs of such close conforming ribs may form opposite sidewalls of substantially sealed compartments (or tanks) inside wing 104, for example, which may be used for carrying fuel for propulsion units 116. For example, as shown in FIG. 6, rib 140b may include a lower rib flange 670, which may closely conform to interior surface 160, and to upper portions and opposing lateral sides of solid trapezoidal plank stringers 136b-d, 136f-h. Fasteners 672, 674, 676, 678, 680, 682 may extend through lower wing skin 120, through respective generally solid trapezoidal cross sections of stringers 136h, 136g, 136f, 136d, 136c, 136b, and through rib flange 670 of rib 140b, for example, in a manner similar to fastener 400, as described above. Similarly, a plurality of fasteners, such as fastener 684, may extend through lower wing skin 120, and through rib flange contacting (or proximate) wing skin 120, for example in a manner similar to fastener 610 described above. Further, an upper portion of rib 140b may be substantially sealed to upper wing skin 124, and lateral sides of rib 140b may be substantially sealed to respective spars 128, 132.

In some embodiments, a reduced rib spacing and/or a 'V' shaped rib may be employed to allow for plank stringers (e.g., similar in structure to stringer 136g) to be structurally joined to the upper panel (e.g., the upper wing skin) of a torque box (e.g., a wingbox), as well as to a lower panel (e.g., the lower wing skin) of the torque box.

As described above, pairs of ribs, such as rib 140b, and rib 140c (see FIG. 2), which may be similar in structure to rib 140b, may form opposing sides of a substantially sealed tank. While one or more of these tanks may be near one or more of propulsion units 116, it may be preferable (e.g., for load bearing purposes) to locate one or more of these tanks closer to fuselage 108, or closer to outboard wing portions 104b.

Figure 7:
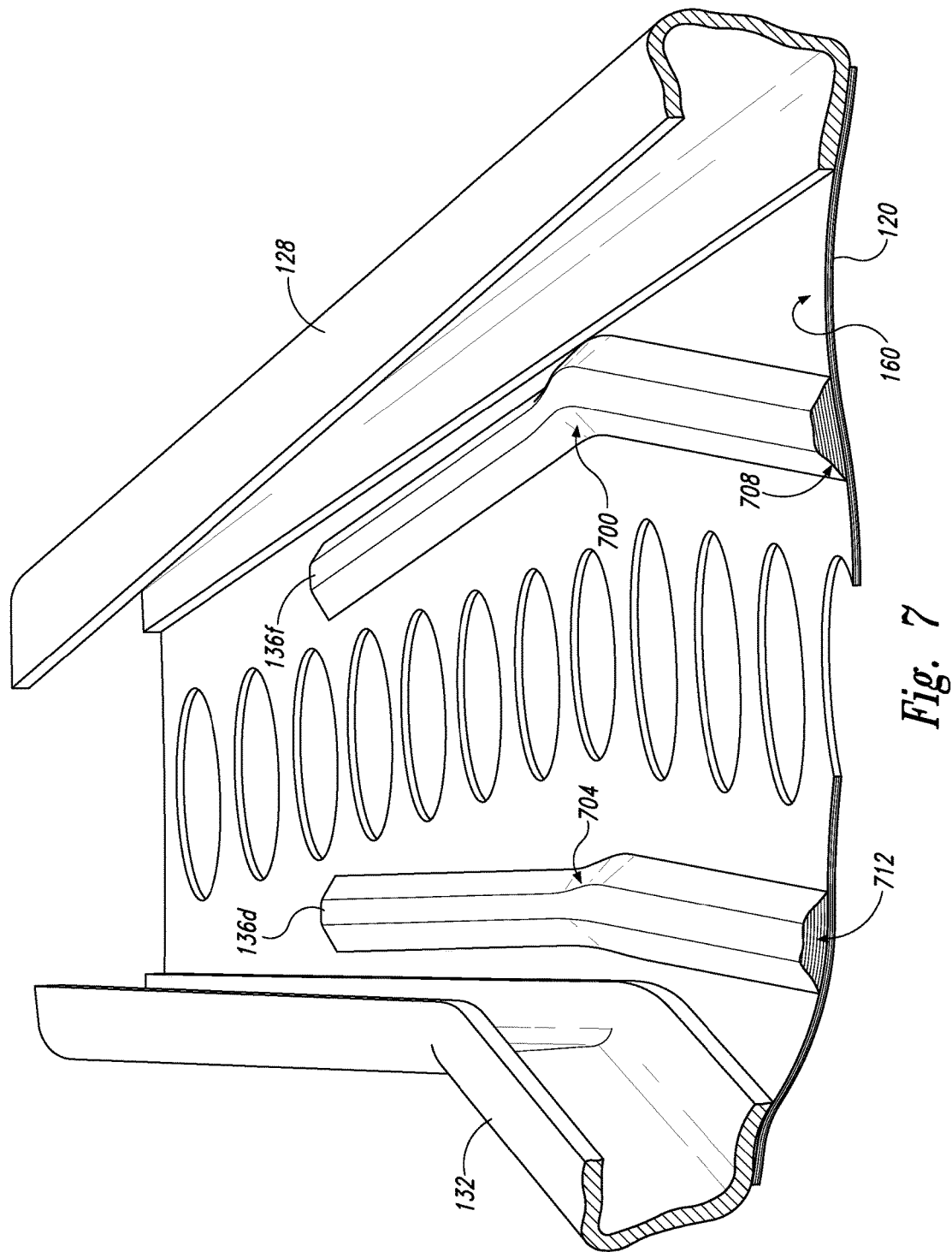
FIG. 7 is a perspective view of an outboard portion of the lower wing skin and two curved stringer transitions.

As shown in FIG. 7, one or more of stringers 136 may include one or more curved transitions. For example, stringer 136f may include a curved portion 700, and stringer 136d may include a curved portion 704. Such curved portions (or transitions) of stringers 136 may be permitted by a stacked configuration of corresponding plies forming the associated stringer, such that the associated stringer has a generally solid cross section, for example, similar to that of stringer 136g described above. For example, to form curved portion 700, plies 708 of stringer 136f may be cut into planar shapes having curved edges, which may then be cured on (or together with, or prior to and then co-bonded with) lower wing skin 120. Plies 712 of stringer 136d may be similarly cut and cured to form stringer 136d having curved portion 704.

In some embodiments, the composite material used for each of stringers 136 and aircraft or wing skins 120, 124 may be a generally lightweight material, such as an uncured pre-impregnated reinforcing tape or fabric (e.g., prepreg). The tape or fabric typically includes a plurality of fibers such as graphite fibers that are embedded within a matrix material, such as a polymer, e.g., an epoxy or phenolic. The tape or fabric could be unidirectional or woven depending on the degree of reinforcement desired. Thus, the prepreg tape or fabric is generally laid onto a mandrel or mold to preform the tape or fabric into the desired shape of the particular stringer of plurality of stringers 136 as defined by the mandrel or mold. However, as described below, it may be preferable to lay up stringer plies directly on lower wing skin 120, in an exemplary co-cure procedure, as will be described in greater detail further below with reference to FIGS. 13-15.

Further, stringers 136 may be any suitable dimension to provide various degrees of reinforcement, and could be comprised of any number of plies of prepreg tape or fabric. Similarly, aircraft skins 120, 124 could be various sizes and thicknesses for both individual and multiple plies depending on the weight and amount of support desired.

In some embodiments, one or more stringer run-out ends, such as ends 170a, 170b, 174a, 174b schematically depicted in FIG. 3, may be flared (e.g., in a direction generally mutually orthogonal with an elongate axis of the associated stringer and a normal direction of the surface to which the associated stringer is structurally joined). Such flaring may be configured to 'ease' the associated load out of the associated stringer and into the tension panel (e.g., the lower wing skin).

In some embodiments, one or more of the plank stringers disclosed herein, such as one or more of stringers 136, may have a varied height and/or width along its length, which may be configured to further optimize a structural characteristic of the associated torque box (or components thereof). For example, build sequences disclosed herein, such as a ply by ply build up of a plank stinger, may enable a height and/or width of a plank stringer to be increased in a region where the plank stringer is interfaced with a rib. For example, an increased width may permit a second fastener to be extended through an associated trapezoidal cross section of the associated stringer directly adjacent a first fastener. The second fastener may similarly be extended through the associated tension panel (e.g., lower wing skin), and into the rib. Further, run-out ends of one or more of the plank stringers (e.g., which may be flared, as described above, and/or tapered, as described further above) may be stepped, which may further ease the load from the stringer into the tension panel.

Example 2

This example describes an illustrative one-piece wing embodiment, which may be alternatively included in aircraft 100; see FIGS. 8-11.

Figure 8:
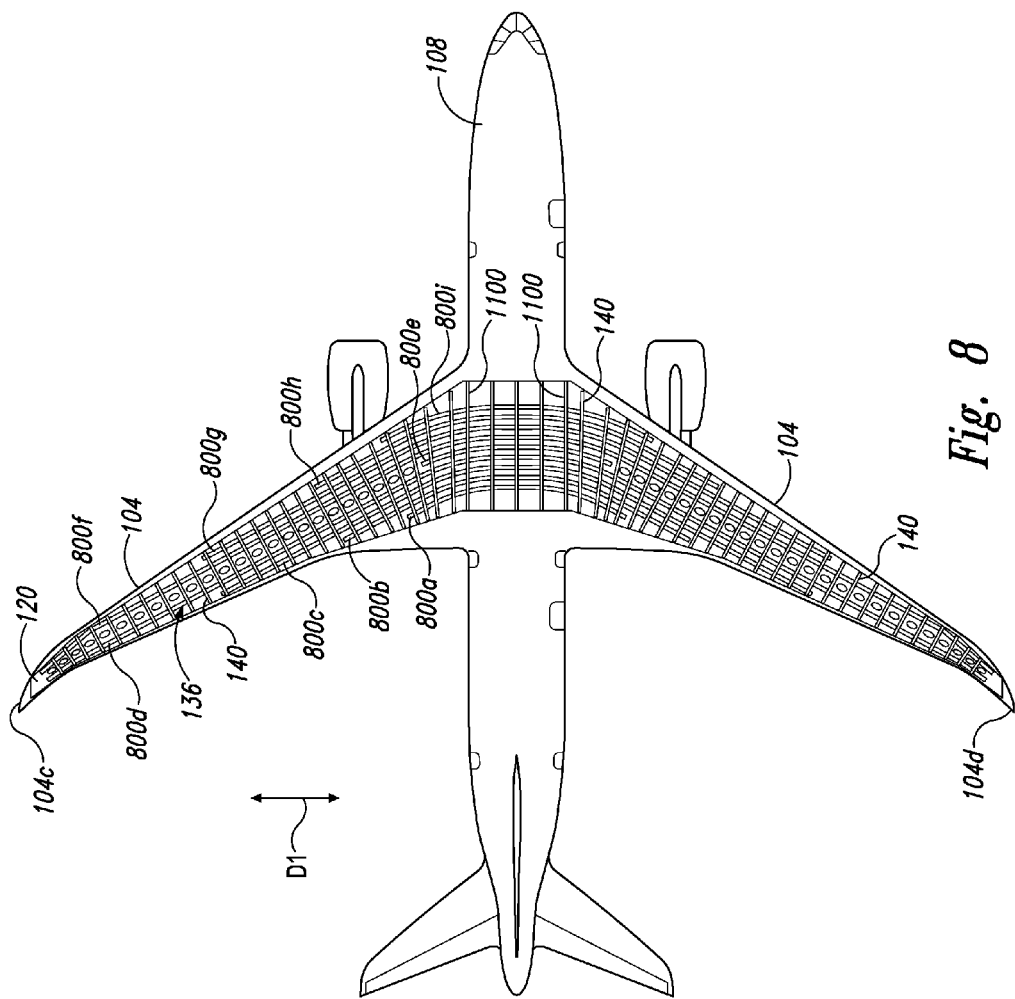
FIG. 8 is a semi-schematic top view similar to FIG. 2, but showing a one-piece wing embodiment.
Figure 9:
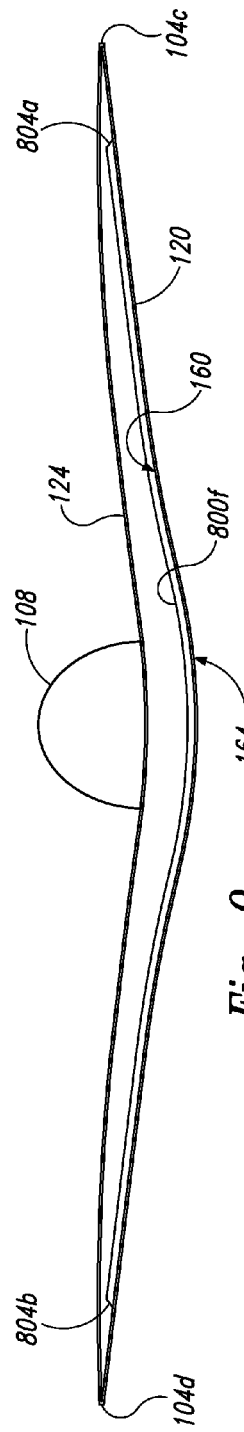
FIG. 9 is a semi-schematic cross-section of the one-piece wing embodiment taken in a plane normal to the elongate axis of the fuselage.

In this example, wing skin 120 may be continuous (or substantially continuous) between wing tips 104c, 104d of wing 104, as can be seen in FIGS. 8 and 9. Further, stringers 136 may include a plurality of stringers, such as stringers 800a-i, which may each be similar in structure to stringer 136g described above.

Figure 10:
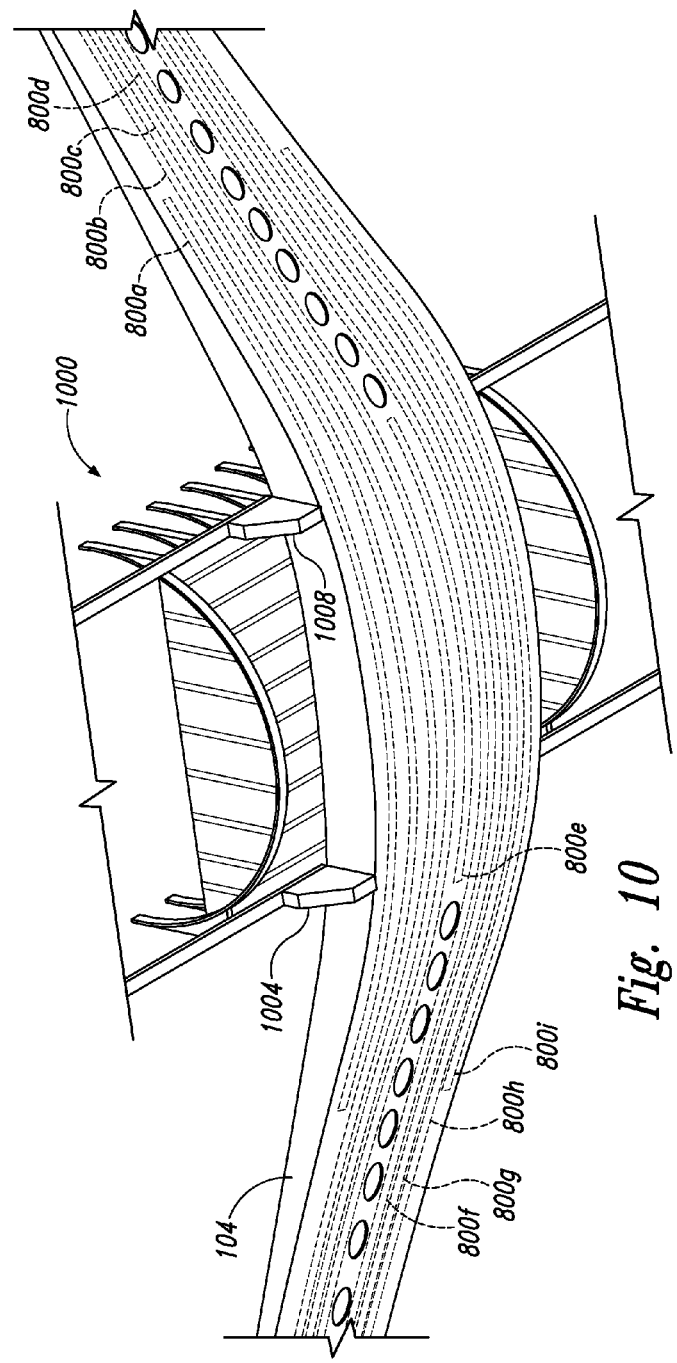
FIG. 10 is a bottom perspective view of a central portion of the one-piece wing embodiment.
Figure 11:
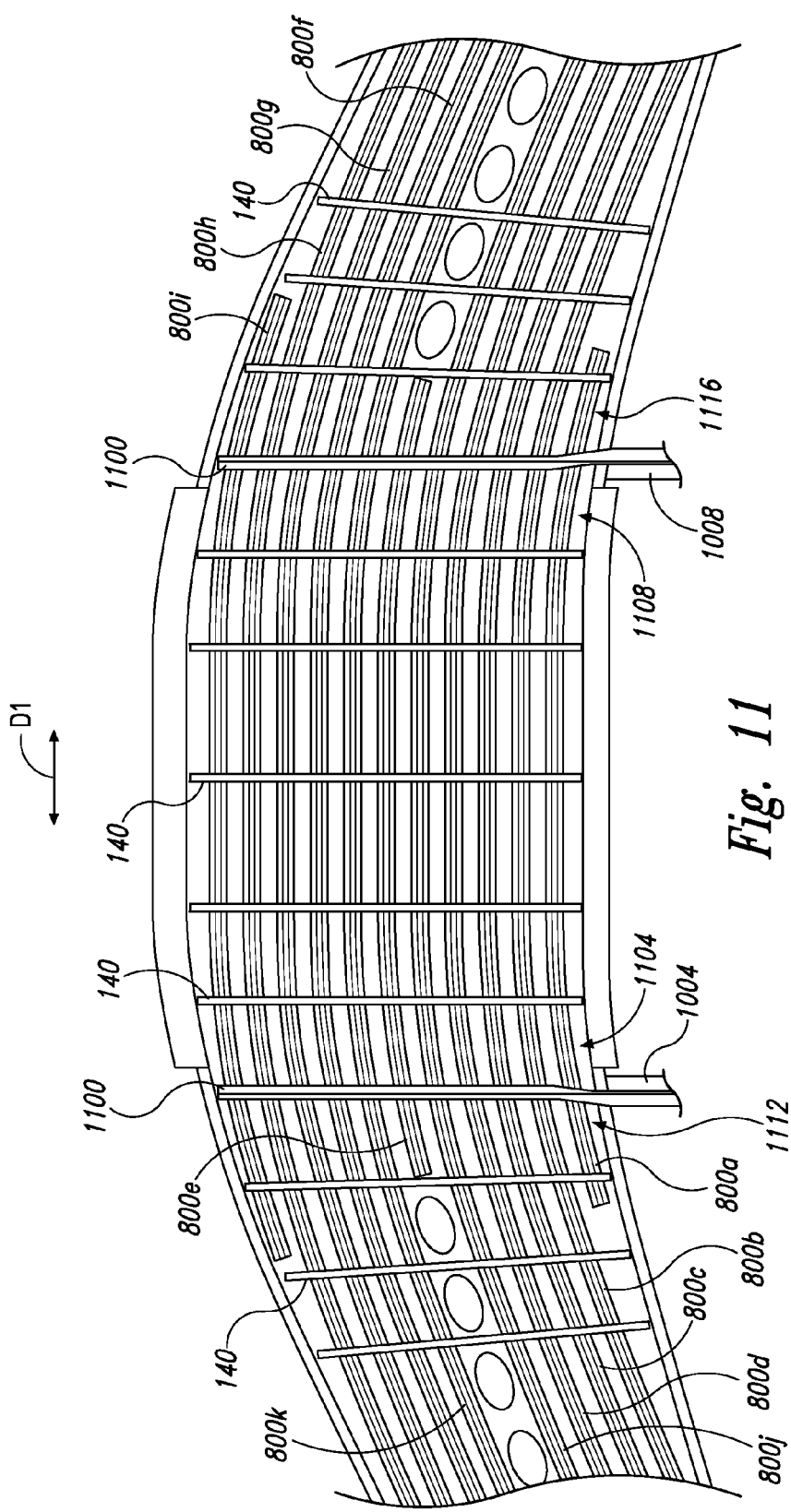
FIG. 11 is a top plan view of the lower wing skin, the plurality of stringers, and the plurality of ribs in the central portion of the one-piece wing embodiment.

As can be seen, stringers 800a-i may each be curved and extend continuously from one of wings 104 to an adjacent wing 104 of aircraft 100. For example, stringers 800a-i may have one or more sweeping curvatures (e.g., in an aft-ward direction, as shown in FIGS. 8 and 11), and one or more dihedral curvatures (e.g., in an up-ward direction, as shown in FIGS. 9 and 10). Associated axes of the one or more sweeping curvatures may be substantially orthogonal to associated axes of the one or more dihedral curvatures. Such mutually orthogonal curvature of the stringers may be permitted (or improved) by an ability of associated plies of the stringers to flex (or be curved) when in an uncured state, such as during a lay-up procedure.

Returning to FIG. 8, each of stringers 800d, 800f are shown extending continuously from one tip (or tip region) 104c of the wing to an opposite tip (or tip region) 104d of the wing relative to associated fuselage 108. Though not shown here to simplify the illustration, one or more fasteners may extend through lower wing skin 120, through generally solid trapezoidal cross sections of respective stringers 800a-i and into associated ribs 140, thereby stiffening wing 104.

Similar to FIG. 3, FIG. 9 depicts an exemplary extension of stringers 136 in this illustration of a one-piece wing embodiment. In particular, FIG. 9 shows stringer 800f extending continuously from a region proximal wing tip 104c, through a region proximal fuselage 108, and to a region proximal opposite wing tip 104d. Similar to stringer 136f, stringer 800f may have tapered run-out ends 804a, 804b, with a thickness of end 804a tapering toward interior surface 160 near wing tip 104c and in a direction away from wing tip 104d. Similarly, end 804b may have a thickness that tapers toward interior surface 160 near wing tip 104d and in a direction away from wing tip 104c. As shown, outboard portions of wings 104 may be angled upward (e.g., by about 6 degrees or other suitable angle, which may correspond to or be associated with the dihedral curvature).

FIG. 10 depicts an illustrative portion of an interior structure 1000 of fuselage 108 coupled to the one-piece wing embodiment of FIG. 8, for example, by wing brackets 1004, 1008. In some embodiments, an exterior of fuselage 108 may be formed by a laminate composite fuselage skin, which may be coupled to structure 1000.

FIG. 11 depicts a semi-schematic top view of a central portion of wing skin 120 in the one-piece wing embodiment, similar to what is illustrated in FIG. 8. In particular, in addition to stringers 800a-i (or any other suitable number of similar stringers), plurality of stringers 136 may include additional stringers, such as stringers 800j, 800k. Further, wing 104 in the one-piece wing embodiment, may include side-of-body ribs 1100 (e.g., instead of side-of-body joints), which may be generally aligned with the opposing lateral sides of fuselage 108, as can also be seen in FIG. 8. In some embodiments, brackets 1004, 1008 may be respectively coupled to associated side-of-body ribs 1100 (see FIG. 11).

As shown, each of stringers 800a-i (or other suitable number of plank stingers) may be easily curved (e.g., enabled by a simplified lay up of curved plies). Such curved plank stringers may permit an effective (or improved) construction of a 1-piece wing, which may be continuously curved. As shown, opposing portions, generally indicated at 1104, 1108, of stringers 800a-k between ribs 1100 may curve away from parallel with span-wise direction D1, for example, about respective first radiuses. Similarly, opposing portions, generally indicated at 1112, 1116, of stringers 800a-k extending away from respective portions 1104, 1108, may curve even further away from parallel with span-wise direction D1, for example, about respective second radiuses. In some embodiments, the first radiuses may be shorter than the second radiuses. For example, each of the first radiuses may be approximately 175 inches, and each of the second radiuses may be approximately 500 inches. Other embodiments may have other suitable plank stringer radii of curvature, such as less than 175 inches, greater than 500 inches, or greater than 175 inches and less than 500 inches.

Example 3

Figure 12:
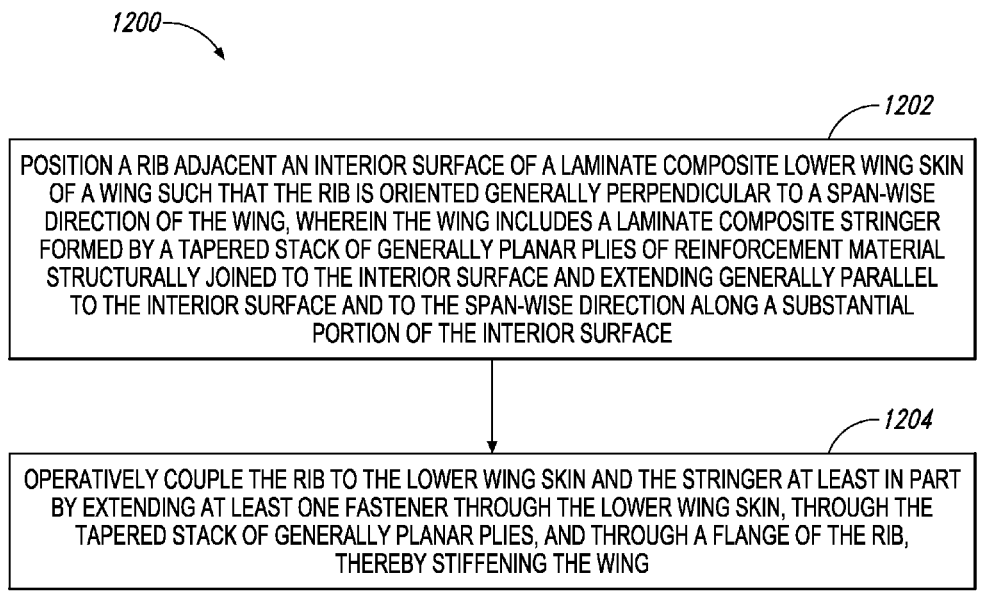
FIG. 12 is a flow chart depicting an illustrative method of stiffening a wing.

This example describes a method for stiffening a wing; see FIG. 12. Aspects of components described herein may be utilized in the method steps described below. Where appropriate, reference may be made to previously described components and systems that may be used in carrying out each step. These references are for illustration, and are not intended to limit the possible ways of carrying out any particular step of the method.

FIG. 12 is a flow chart illustrating steps performed in an illustrative method, and may not recite the complete process. In particular, FIG. 12 depicts multiple steps of a method, generally indicated at 1200, which may be performed in conjunction with disclosed embodiments according to aspects of the present disclosure. Although various steps of method 1200 are described below and depicted in FIG. 12, the steps need not necessarily all be performed, and in some cases may be performed in a different order than the order shown.

For example, method 1200 may include a step 1202 of positioning a rib, such as rib 140a (or rib 140b, or rib 1100), adjacent an interior surface of a laminate composite lower wing skin of a wing (e.g., adjacent interior surface 160), such that the rib is oriented generally perpendicular to a span-wise direction of the wing, such as span-wise direction D1 of wing 104. For example, the wing may include a laminate composite stringer, such as stringer 136g (or any one of stringers 800a-k), formed by a tapered stack of generally planar plies of reinforcement material structurally joined to the interior surface of the lower wing skin. The tapered stack of generally planar plies may extend generally parallel to the interior surface and the span-wise direction along a substantial portion of the interior surface of the lower wing skin.

Method 1200 may further include a step 1204 of operatively coupling the rib to the lower wing skin and the stringer at least in part by extending at least one fastener, such as fastener 400, through the lower wing skin, through the tapered stack of generally planar plies, and through a flange of the rib (e.g., rib flange 402), thereby stiffening the wing.

In some embodiments, the tapered stack may have a generally solid trapezoidal cross section in a plane generally perpendicular to the span-wise direction. At least a majority of the solid trapezoidal cross section may be characterized by the planar plies of reinforcement material. An aperture, such as aperture 602 depicted in FIG. 5, may be formed through the lower wing skin and the trapezoidal cross section. In such an embodiment, the extending step (e.g., extending at least one fastener through the lower wing skin, through the tapered stack of generally planar plies, and through the flange) may involve disposing the at least one fastener in the aperture and inserting the fastener into the flange of the rib.

In some embodiments, step 1202 may further include disposing an adjacent portion of the flange, such as the portion of flange 402 extending between stringers 136d, 136f in FIG. 4, on the interior surface adjacent the tapered stack. In such a case, among others, step 1204 may further include fastening the adjacent portion of the flange to the interior surface by extending at least one other fastener, such as fastener 610, through the lower wing skin and the adjacent portion of the flange.

Example 4

This example describes a method of forming (or manufacturing) a tension panel, such as wing skin 120, with respective stringers, such as stringers 136 (e.g., stringers 136a-z, 136zz and/or stringers 800a-k) structurally joined thereto; see FIGS. 13-15.

As shown in FIG. 13, a plurality of plies of skin reinforcement material, generally indicated at 1300, may be stacked on a skin caul 1304. For example, plies 1304 may correspond to an uncured configuration of plies 502, which when cured may form lower wing skin 120. For example, plies 1304 may correspond to a plurality of generally planar carbon fiber pre-preg plies with various angular orientations. For example, plies 1304 may correspond to plies P1-P36 shown in Table 3 below, with ply P1 corresponding to the ply adjacent caul 1304, ply P36 being furthest from caul 1304, and plies P2-P35 being serially disposed there between.

TABLE 3

| Ply | Orientation |
| --- | --- |
| P1 | 45 |
| P2 | 90 |
| P3 | −45 |
| P4 | 0 |
| P5 | 45 |
| P6 | 0 |
| P7 | −45 |
| P8 | 0 |
| P9 | 45 |
| P10 | 0 |
| P11 | −45 |
| P12 | 90 |
| P13 | 45 |
| P14 | 0 |
| P15 | −45 |
| P16 | 0 |
| P17 | 45 |
| P18 | 0 |
| P19 | −45 |
| P20 | 0 |
| P21 | 45 |
| P22 | 0 |
| P23 | −45 |
| P24 | 90 |
| P25 | 45 |
| P26 | 0 |
| P27 | −45 |
| P28 | 0 |
| P29 | 45 |
| P30 | 0 |
| P31 | −45 |
| P32 | 0 |
| P33 | 45 |
| P34 | 0 |
| P35 | 90 |
| P36 | −45 |

Numbers in the orientation column in Table 3 above may correspond to approximate angle arrangement of fibers in the associated ply with respect to an axis generally normal to an upper surface of caul 1304. For example, fibers in ply P1, which may correspond to exterior surface 164 (see FIG. 5) may correspond to fibers of ply P1 forming a 45 degree angle with the plane of the view of FIG. 13 (and FIG. 5). In some embodiments, each of plies P1-P36 listed in Table 3 and included in plurality 1300 may be any suitable composite ply material, such as one or more of those described above with reference to Table 1. As shown in FIG. 14, a plurality of plies of stringer reinforcement material, generally indicated at 1400 may be positioned (and/or stacked) on a flat table 1404, or other suitable surface. Plies 1400 may be laid up in a symmetrical repetitive sequence. For example, plies 1400 may include 22 plies, such as plies P1-P22 listed in Table 4 below, with ply P1 corresponding to the ply closest to table 1404, and orientations corresponding to approximate angle arrangement of fibers in the associated ply with respect to an axis generally normal to an upper surface of table 1404, in a manner similar to that described above with reference to Table 3.

TABLE 4

| Ply | Orientation |
|---|---|
| P1 | 0 |
| P2 | 45 |
| P3 | 0 |
| P4 | 0 |
| P5 | −45 |
| P6 | 90 |
| P7 | 45 |
| P8 | 0 |
| P9 | 0 |
| P10 | −45 |
| P11 | 0 |
| P12 | 0 |
| P13 | 45 |
| P14 | 0 |
| P15 | 0 |
| P16 | −45 |
| P17 | 90 |
| P18 | 45 |
| P19 | 0 |
| P20 | 0 |
| P21 | −45 |
| P22 | 0 |

In other embodiments, plies 1400 may be laid down in other configurations, mixes, and/or orientations.

An ultrasonic knife 1408, or other suitable cutting device, mechanism, or apparatus, may be used to cut stacked plies 1400 into one or more trapezoidal shapes or stacks (e.g., with variable angles including but not limited to 30 degrees, 45 degrees, or 60 degrees), such as trapezoidal stacks 1412, 1416, 1420, 1424, 1428, 1432, 1436. For example, knife 1408 may be used to make cuts 1440, 1444, 1448, 1452, 1456, among others, through plies 1400. For example, cut 1440 may define a lateral edge of stack 1412, and cut 1444 may define complimentary and adjacent lateral edges of respective stacks 1412, 1416. Similarly, cut 1448 may define facing lateral edges of respective stacks 1416, 1420; cut 1452 may define facing lateral edges of respective stacks 1420, 1424; and cut 1456 may define facing lateral edges of respective stacks 1424, 1428. Alternative knives include a water jet and a laser, not shown.

As mentioned above, knife 1408 may be used to make other cuts, such as a cut defining both of lateral edges 1428a, 1432a of respective stacks 1428, 1432. Similarly, knife 1408 may be used to make a cut defining both of lateral edges 1432b, 1436a of respective stacks 1432, 1436. As shown, the cuts made by knife 1408 may be spaced such that stack 1412 has opposing upper and lower bases (as oriented in FIG. 14) with respective lengths or dimensions d1, d2. Similarly, the other cuts made with knife 1408 may be spaced such that stack 1416 has respective opposing upper and lower bases with (approximate) respective dimensions d3, d2; stack 1420 has respective opposing upper and lower bases with (approximate) respective dimensions d3, d4; stack 1424 has respective opposing upper and lower bases with (approximate) respective dimensions d5, d4; stack 1428 has respective opposing upper and lower bases with (approximate) respective dimensions d5, d6; stack 1432 has respective opposing upper and lower bases with (approximate) respective dimensions d7, d6; and stack 1436 has respective opposing upper and lower bases with (approximate) respective dimensions d7, d8.

Once a cut has been made, the defined edges of the corresponding stack(s) may be inspected, and every other stack may be rotated (or flipped), for example, such that all of stacks 1412, 1416, 1420, 1424, 1428, 1432, 1436 have their longer base side facing generally in the same direction. For example, once stacks 1432, 1436 have been cut, separated, and/or inspected, stack 1436 may be flipped onto stack 1432, such that a base of stack 1436 having length d7 contacts and is aligned with a base of stack 1432 having a similar length d7.

Stacks 1412, 1416, 1420, 1424, 1428, 1432, 1436 of cut stringer plies 1400 may then be transferred onto stacked skin plies 1300, as shown in FIG. 15, for example, to form an uncured stringer 1500 there on. In a similar fashion, other trapezoidal stacks of stringer plies may be cut and stacked on stacked skin plies 1300, for example, to form adjacent uncured stringers 1504, 1508 there on. In some embodiments, a fabric overwrap layer, such as a pre-impregnated carbon fiber fabric, or other suitable composite fabric material (e.g., such as one or more of those described with reference to Table 1), may be disposed over stacked skin plies 1300 and/or one or more of stringers 1500, 1504, 1508.

Further, in some embodiments, a top caul, such as top caul 1512 may be placed on an upper surface of each of (or one or more of) stringers 1500, 1504, 1508. However, to simplify the illustration, only one top caul 1512 is shown. Top caul 1512 may be made of a substantially rigid material, which may be configured to improve a cured surface of the associated stringer. For example, top caul 1512 may be made of sheet shim stock having a thickness of about 0.005 inches, or other suitable material. In some embodiments, top caul 1512 may extend beyond opposing edges of the upper surface of the associated stringer by about 0.35 inches, or other suitable overlap.

A vacuum bag material may be disposed over skin stack 1300 and stringers 1500, 1504, 1508 opposite skin caul 1304, and substantially hermetically sealed to skin caul 1304, thereby forming a vacuum chamber in which skin stack 1300 and stringers 1500, 1504, 1508 may be disposed. A suitable apparatus, such as a vacuum pump, may be operative coupled to the vacuum chamber and operated to substantially evacuate the vacuum chamber, which may result in the vacuum bag material compacting stringers 1500, 1504, 1508 and skin stack 1300. This compacted configuration may then be heated, such as in an autoclave, until matrix material in stack 1300 and stringers 1500, 1504, 1508 has been suitably cured (e.g., co-cured), thereby structurally joining plies 1300 to one another, plies of respective stringers 1500, 1504, 1508 to one another, and stringers 1500, 1504, 1508 to plies 1300.

Once suitably cured, the compacted configuration may be removed from the autoclave, or other suitable curing device, the vacuum bag material may be removed, and the cure inspected. Once suitably cured, this cured configuration (e.g., cured tension panel) may be incorporated into (or used) in a wing assembly, or other suitable assembly comprising a torque box. For example, cured skin 1300 may be incorporated into aircraft 100 as lower wing skin 120. For example, an upper surface 1300a of cured skin 1300 may correspond to interior surface 160 of lower wing skin 120, and a lower surface 1300b of cured skin 1300 may correspond to exterior surface 164. Similarly, cured stringers 1500, 1504, 1508 may correspond to respective stringers of plurality of stringers 136. For example, cured stringer 1500 may correspond to stringer 136g. In particular, cured stacks 1412, 1416, 1420, 1424, 1428, 1432, 1436 may correspond respectively to subsets 500g, 500f, 500e, 500d, 500c, 500b, 500a depicted in FIG. 5. For example, in addition to cured stack 1412, a lower portion of subset 500g adjacent interior surface 160 may include one or more plies in addition to cured stack 1412, such as plies P1-P7 listed in Table 1, which may be laid down in an uncured condition on uncured stack 1300 in between uncured stack 1300 and uncured stack 1412, prior to compression and cure.

In some embodiments, a process of inner mold line (IML) manufacture may be used rather than the outer mold line (OML) manufacture described above. For example, a notched tool may be provided. The notched tool may have an upper surface similar in shape to an upper surface of stacks 1300, 1500, 1504, 1512. For example, the upper surface of the notched tool may include a plurality of inverted trapezoidal shaped notches. The trapezoidal stacks for forming the stringers may be inverted and serially disposed in the trapezoidal notches formed in the upper surface of the tool. For example, stacks 1412, 1416, 1420, 1424, 1428, 1432, 1436 may be transferred to one of the trapezoidal notches such that all of stacks 1412, 1416, 1420, 1424, 1428, 1432, 1436 have their respective shorter base sides facing generally in the same direction (e.g., toward the upper surface of the notched tool). For example, once stacks 1432, 1436 have been cut, separated, and/or inspected, stack 1432 may be flipped onto stack 1436 such that a short base of stack 1432 having dimension d7 contacts and is generally aligned with a long base of stack 1436 having dimension d7.

Once these inverted trapezoidal stringer stacks have been suitably disposed in the notches, stack 1300 may be disposed on these inverted trapezoidal stringer stacks, such that surface 1300a of stack 1300 contacts the wide bases of these inverted trapezoidal stringer stacks and portions of the upper surface of the notched tool disposed there between.

In some embodiments, each stringer may be formed from one or more cut trapezoidal stringer stacks, for example, in either an OML or IML manufacture.

In some embodiments, stringers 1500, 1504, 1508 may be co-bonded to stack 1300. For example, stack 1300 may be cured, and then stringers 1500, 1504, 1508 may be cured on cured stack 1300.

In some embodiments, stringers 1500, 1504, 1508 may be reverse co-bonded to stack 1300. For example, stringers 1500, 1504, 1508 may be cured, and then uncured stack 1300 may be cured on cured stringers 1500, 1504, 1508.

Example 5

This section describes additional aspects and features of embodiments presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A wing comprising: a wing skin having an interior surface with a length extending generally parallel to a span-wise direction of the wing; a laminate composite first stringer a majority of which is characterized by a stacked plurality of generally planar plies of reinforcement material structurally joined as a stack to the interior surface and extending generally parallel to the interior surface and the span-wise direction along a substantial portion of the interior surface, the first stringer having a generally solid trapezoidal cross section when viewed in a plane that is generally perpendicular to the span-wise direction such that a first ply of the stacked plurality of generally planar plies proximal the interior surface has a wider width than a second ply of the stacked plurality of generally planar plies that is further from the interior surface than the first ply; a rib positioned adjacent the interior surface and extending generally perpendicular to the span-wise direction, the rib including a rib flange and being shaped to define a passageway between the rib flange and the interior surface, wherein the first stringer passes through the passageway such that the trapezoidal cross section is interfaced with the rib flange; and at least one fastener extending through the wing skin, the trapezoidal cross section, and the rib flange.

A2. The wing of paragraph A1, wherein the stringer extends continuously from one tip of the wing to an opposite tip of the wing relative to an associated fuselage.

A3. The wing of paragraph A1, wherein the passageway has a height extending from the rib flange to the interior surface of the wing skin, the trapezoidal cross section having a height extending in a direction locally normal to the interior surface, the height of the passageway being substantially the same height as the height of the trapezoidal cross section.

A4. The wing of paragraph A3, wherein the height of the passageway extends no more than two inches from the interior surface in the direction locally normal to the interior surface.

A5. The wing of paragraph A1, wherein the wing skin is a lower wing skin of the wing, and has an exterior surface opposite the interior surface, the exterior surface forming a lower exterior portion of the wing.

A6. The wing of paragraph A5, further comprising a plurality of stringers in addition to the first stringer, each of the plurality of stringers being a laminate composite characterized by a respective plurality of stacked generally planar plies of reinforcement material structurally joined to the interior surface and extending generally parallel to the interior surface and the span-wise direction along a substantial portion of the interior surface adjacent the first stringer, wherein the rib flange has a generally ruled lower surface that is interfaced with at least a first subset of stringers of the plurality of stringers in addition to the first stringer such that a majority of the interior surface directly below the lower surface of the rib flange does not contact the lower surface of the rib flange.

A7. The wing of paragraph A6, wherein the rib contacts and is attached to the lower wing skin between the first stringer and a second set of the plurality of stringers by one or more fasteners extending through the lower wing skin and through the rib.

A8. The wing of paragraph A5, wherein the lower wing skin is a laminate composite including a plurality of plies of reinforcement material, the stacked plurality of generally planar plies of the first stringer and the plurality of plies of the lower wing skin being structurally joined to one another by matrix material.

A9. The wing of paragraph A5, wherein the stacked plurality of generally planar plies includes a plurality of layers of tape arranged, with respect to an axis of the trapezoidal cross section that is generally normal to the interior surface, at approximate angles ranging from 0 to 90 degrees, with 0 degrees corresponding to fibers in the associated layer of tape extending generally parallel to the span-wise direction, a greater percentage of layers of tape being arranged at an approximate angle of 0 degrees in an upper portion of the trapezoidal cross section than in a lower portion of the trapezoidal cross section that is disposed between the upper portion and the interior surface.

A10. The wing of paragraph A9, wherein the upper portion and the lower portion include approximately the same number of layers of tape, fibers of the layers of tape being carbon fibers, the matrix material being a polymer.

A11. The wing of paragraph A1, wherein a number of the generally planar plies in the stacked plurality and disposed in the trapezoidal cross section is in a range of 100 to 200 plies.

A12. The wing of paragraph A11, wherein opposing lateral sides of the trapezoidal cross section form respective angles with a local portion of the interior surface in a range of 30 to 60 degrees.

B1. A wing for an aircraft, comprising: a lower wing skin defining a lower exterior surface of the wing; a plurality of stringers joined to the lower wing skin; a rib extending generally perpendicular to the stringers, the rib being positioned opposite the lower wing skin relative to the plurality of stringers; and a fastener extending through the lower wing skin, through a first stringer of the plurality of stringers, and into the rib; wherein: the lower wing skin is a laminate composite; each stringer is a laminate composite including a respective plurality of plies of reinforcement material structurally joined to the lower wing skin by matrix material; each ply of the plurality of plies is generally locally parallel to the lower exterior surface of the wing; and each stringer has a cross section extending in a plane substantially parallel to and aligned with the rib, each cross section being generally tapered and solid, with a width that decreases as measured locally parallel to the lower exterior surface of the wing, when progressing from adjacent the lower wing skin to adjacent the rib, and the plurality of plies filling a substantial portion of the respective cross section.

B2. The wing of paragraph B1, wherein each plurality of plies includes a plurality of layers of tape arranged, with respect to an axis locally perpendicular to the exterior surface, at a plurality of different angles, with an approximately 0 degree angle corresponding to fibers of the associated layer of tape extending generally parallel to a span-wise direction of the wing, a greater percentage of layers of tape being arranged at an angle of approximately 0 degrees in an upper portion of the associated cross section than in a lower portion of the associated cross section.

B3. The wing of paragraph B2, wherein the upper portion and the lower portion include approximately the same number of layers of tape.

B4. The wing of paragraph B3, wherein the upper portion and the lower portion each include layers of tape arranged at approximate angles of 0 degrees, 30 degrees, 45 degrees, 60 degrees, 90 degrees, −30 degrees, −45 degrees, and −60 degrees.

B5. The wing of paragraph B4, wherein the cross section of the first stringer is a trapezoidal cross section a majority of which is composed of fibers of associated layers of tape.

C1. A method of stiffening a wing, comprising the steps of: positioning a rib adjacent an interior surface of a laminate composite lower wing skin of the wing such that the rib is oriented generally perpendicular to a span-wise direction of the wing, wherein the wing includes a laminate composite stringer formed by a tapered stack of generally planar plies of reinforcement material structurally joined to the interior surface and extending generally parallel to the interior surface and to the span-wise direction along a substantial portion of the interior surface; and operatively coupling the rib to the lower wing skin and the stringer at least in part by extending at least one fastener through the lower wing skin, through the tapered stack of generally planar plies, and through a flange of the rib, thereby stiffening the wing.

C2. The method of paragraph C1, wherein the tapered stack has a generally solid trapezoidal cross section in a plane generally perpendicular to the span-wise direction, at least a majority of the solid trapezoidal cross section being characterized by the planar plies of reinforcement material, an aperture being formed through the lower wing skin and the trapezoidal cross section, and the extending step involves disposing the at least one fastener in the aperture and inserting the fastener into the flange of the rib.

C3. The method of paragraph C1, wherein the positioning step further includes disposing an adjacent portion of the flange on the interior surface adjacent the tapered stack, and the operatively coupling step further includes fastening the adjacent portion of the flange to the interior surface by extending at least one other fastener through the lower wing skin and the adjacent portion of the flange.

D1. An aircraft comprising: a fuselage having opposite first and second lateral sides; a first wing extending from the first lateral side; a second wing extending from the second lateral side; a laminate composite lower wing skin defining a lower exterior surface for at least a portion of each of the first and second wings; a laminate composite first stringer structurally joined to the lower wing skin and extending along the lower wing skin opposite the exterior surface, the first stringer extending continuously between the first and second wings.

D2. The aircraft of paragraph D1, wherein the first stringer includes a first plurality of plies of reinforcement material, the lower wing skin includes a second plurality of plies of reinforcement material, and the first plurality of plies is structurally joined to the second plurality of plies by matrix material.

D3. The aircraft of paragraph D2, wherein the reinforcement material of both the first and second plurality of plies includes carbon fiber reinforcement material, and the matrix material includes a polymer resin.

E1. A method of assembling a composite wing structure comprising the steps of: stacking a plurality of plies of skin reinforcement fiber and matrix material to define a wing-shaped stack of plies; stacking a plurality of plies of stringer reinforcement fiber and matrix material to define a plank-shaped stack of plies; cutting the plurality of plies of stringer reinforcement fiber so that a ply on one face of the plank-shaped stack of plies is substantially wider than a ply on an opposite face of the plank-shaped stack of plies, thereby defining a tapered stack of plies; placing the tapered stack of plies on the wing-shaped stack of plies, with the substantially wider ply adjacent the wing-shaped stack of plies, and with a substantially continuous stack of parallel plies extending from a lower-most ply to an uppermost ply including wing-shaped plies and plank-shaped plies; bonding the fibers in the plies and the matrix material into a solid fiber matrix laminate to define a lower wing skin for the wing, with a stringer running along a length of the wing, and with a substantially solid cross-section when viewed through the stringer.

E2. The method of paragraph E1, wherein the step of bonding the fibers in the plies and the matrix material into a solid fiber matrix laminate is performed generally simultaneously for all of the plies in the wing-shaped stack of plies and the plank-shaped stack of plies thereby defining an integrally formed wing-and-stringer solid fiber matrix laminate.

E3. The method of paragraph E1, further comprising: placing multiple tapered stacks of plies and matrix material on the wing-shaped stack of plies, so that the tapered stacks run along a length of the wing-shaped stack; and bonding the fibers in each of the multiple tapered stacks of plies and matrix material into a solid fiber matrix laminate to define a plurality of stringers running along a length of the wing, and with a substantially solid cross-section when viewed through each of the plurality of stringers.

E4. The method of paragraph E1, further comprising: cutting a plurality of plies of stringer reinforcement fiber into multiple plank-shaped tapered stacks of plies, so that multiple plank-shaped tapered stacks of plies are cut from one plurality of plies of stringer reinforcement fiber, with alternating tapers in adjacent plank-shaped tapered stacks of plies.

E5. The method of paragraph E4, wherein the step of cutting a plurality of plies of stringer reinforcement fiber into multiple plank-shaped tapered stacks of plies uses an ultrasonic knife, a water jet, or a laser.

F1. A method of stiffening a carbon fiber matrix laminate skin, comprising the steps of: forming a laminate skin consisting of substantially parallel, generally planar plies of reinforcement fibers, bonded with a matrix material; forming multiple laminate stringers each essentially consisting of substantially parallel, generally planar plies of reinforcement fibers, bonded with a matrix material; joining the laminate skin to each of the multiple laminate stringers so that the fibers in a substantial portion of both the laminate skin and each of the multiple laminate stringers are all substantially parallel and define a continuous ply-by-ply when viewed along a line extending from an exterior surface of the laminate skin to an interior portion of each of the stringers, distant from the exterior surface.

G1. A method of forming a tension panel for a wing of an aircraft comprising the steps of: stacking a plurality of plies of skin reinforcement fiber and matrix material to define a panel-shaped stack of plies, with each skin reinforcement fiber extending in a substantially straight line from fiber end to fiber end; stacking a plurality of plies of stringer reinforcement fiber and matrix material to define a plank-shaped stack of plies, with each stringer reinforcement fiber extending in a substantially straight line from fiber end to fiber end; cutting the plurality of plies of stringer reinforcement fiber so that a ply on one face of the plank-shaped stack of plies is substantially wider than a ply on an opposite face of the plank-shaped stack of plies, thereby defining a tapered stack of plies; placing the tapered stack of plies on the panel-shaped stack of plies, with the substantially wider ply adjacent the panel-shaped stack of plies, and with a substantially continuous stack of parallel plies extending from a lower-most ply to an uppermost ply including panel-shaped plies and plank-shaped plies; bonding the fibers in the plies and the matrix material into a solid fiber matrix laminate to define a tension panel for a wing, with a stringer running along a length of the tension panel, and with a substantially solid cross-section when viewed through the stringer.

G2. The method of paragraph G1, wherein the step of bonding the fibers in the plies and the matrix material into a solid fiber matrix laminate is performed generally simultaneously for all of the plies in the wing-shaped stack of plies and the plank-shaped stack of plies thereby defining an integrally formed wing-and-stringer solid fiber matrix laminate.

G3. The method of paragraph G1, further comprising: placing multiple tapered stacks of plies and matrix material on the wing-shaped stack of plies, so that the tapered stacks run along a length of the wing-shaped stack; and bonding the fibers in each of the multiple tapered stacks of plies and matrix material into a solid fiber matrix laminate to define a plurality of stringers running along a length of the wing, and with a substantially solid cross-section when viewed through each of the plurality of stringers.

G4. The method of paragraph G1, further comprising: cutting a plurality of plies of stringer reinforcement fiber into multiple plank-shaped tapered stacks of plies, so that multiple plank-shaped tapered stacks of plies are cut from one plurality of plies of stringer reinforcement fiber, with alternating tapers in adjacent plank-shaped tapered stacks of plies.

G5. The method of paragraph G4, wherein the step of cutting a plurality of plies of stringer reinforcement fiber into multiple plank-shaped tapered stacks of plies uses an ultrasonic knife, a water jet, or a laser.

H1. A method of cutting multiple stiffeners, comprising the steps of: stacking a plurality of plies of stringer reinforcement fiber and matrix material to define a stack of generally parallel plies, with each stringer reinforcement fiber extending in a substantially straight line from fiber end to fiber end; cutting the stack of generally parallel plies along multiple generally parallel sloped planes to define a plurality of tapered plank-shaped stacks of plies, with adjacent stacks tapering in opposite directions progressing from a bottom of a stack to a top of the stack; flipping alternate stacks to reorient the alternate stacks so that all of plurality of tapered plank-shaped stacks of plies taper in a similar direction progressing from a bottom of each stack to a top of each stack.

H2. The method of paragraph H1, further comprising the steps of: spacing the generally parallel sloped planes so that a first stack has a top width that is approximately equal to a bottom width of a second stack, wherein the second stack may be placed on top of the first stack to create a combined continuously tapered plank-shaped stack of plies.

Advantages, Features, Benefits

The different embodiments described herein provide several advantages over known solutions for stiffening a wing. For example, the illustrative embodiments described herein permit a fastener to be extended through a wing skin, through a solid trapezoidal cross section of a laminated composite stringer structurally joined to the wing skin, and through a rib, among other embodiments. Other advantages may include reduced stringer tooling, and an ability to tailor ply orientations through the laminate (e.g., bias more 0 degree plies toward a top of the plank stringer). However, not all embodiments described herein provide the same advantages or the same degree of advantage.

CONCLUSION

The disclosure set forth above may encompass multiple distinct embodiments with independent utility. Although each of these embodiments has been disclosed in its preferred form(s), the specific details of which as disclosed and illustrated herein are not to be considered in a limiting sense, because numerous variations are possible. The subject matter of the embodiments includes all novel and nonobvious combinations and subcombinations of the various elements, features, functions, and/or properties disclosed herein. The following claims particularly point out certain combinations and subcombinations regarded as novel and nonobvious. Embodiments of other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the embodiments of the present disclosure.

What is claimed is:

1. A wing comprising:
    a wing skin having an interior surface with a length extending generally parallel to a span-wise direction of the wing;
    a laminate composite first stringer a majority of which is characterized by a stacked plurality of generally planar plies of reinforcement material structurally joined as a stack to the interior surface and extending generally parallel to the interior surface and the span-wise direction along a substantial portion of the interior surface, the first stringer having a generally solid trapezoidal cross section when viewed in a plane that is generally perpendicular to the span-wise direction such that a first ply of the stacked plurality of generally planar plies proximal the interior surface has a wider width than a second ply of the stacked plurality of generally planar plies that is further from the interior surface than the first ply;
    a rib positioned adjacent the interior surface and extending generally perpendicular to the span-wise direction, the rib including a rib flange and being shaped to define a passageway between the rib flange and the interior surface, wherein the first stringer passes through the passageway such that the trapezoidal cross section is interfaced with the rib flange; and
    at least one fastener extending through the wing skin, the trapezoidal cross section, and the rib flange, wherein the first stringer has a top face distal from the interior surface, the rib flange contacting the top face of the first stringer.

2. The wing of claim 1, wherein the stringer extends continuously from one tip of the wing to an opposite tip of the wing.

3. The wing of claim 1, wherein the passageway has a height extending from the rib flange to the interior surface of the wing skin, the trapezoidal cross section having a height extending in a direction locally normal to the interior surface, the height of the passageway being substantially the same height as the height of the trapezoidal cross section.

4. The wing of claim 3, wherein the height of the passageway extends no more than two inches from the interior surface in the direction locally normal to the interior surface.

5. The wing of claim 1, wherein the wing skin is a lower wing skin of the wing, and has an exterior surface opposite the interior surface, the exterior surface forming a lower exterior portion of the wing.

6. The wing of claim 5, further comprising a plurality of stringers in addition to the first stringer, each of the plurality of stringers being a laminate composite characterized by a respective plurality of stacked generally planar plies of reinforcement material structurally joined to the interior surface and extending generally parallel to the interior surface and the span-wise direction along a substantial portion of the interior surface adjacent the first stringer, wherein the rib flange has a generally ruled lower surface that is interfaced with at least a first subset of stringers of the plurality of stringers in addition to the first stringer such that a majority of the interior surface directly below the lower surface of the rib flange does not contact the lower surface of the rib flange.

7. The wing of claim 6, wherein the rib contacts and is attached to the lower wing skin between the first stringer and a second set of the plurality of stringers by one or more fasteners extending through the lower wing skin and through the rib.

8. The wing of claim 5, wherein the lower wing skin is a laminate composite including a plurality of plies of reinforcement material, the stacked plurality of generally planar plies of the first stringer and the plurality of plies of the lower wing skin being structurally joined to one another by matrix material.

9. The wing of claim 5, wherein the stacked plurality of generally planar plies includes a plurality of layers of tape arranged, with respect to an axis of the trapezoidal cross section that is generally normal to the interior surface, at approximate angles ranging from 0 degrees to 90 degrees, with 0 degrees corresponding to fibers in the layer of tape extending generally parallel to the span-wise direction, a greater percentage of layers of tape being arranged at an approximate angle of 0 degrees in an upper portion of the trapezoidal cross section than in a lower portion of the trapezoidal cross section that is disposed between the upper portion and the interior surface.

10. The wing of claim 9, wherein the upper portion and the lower portion include approximately the same number of layers of tape, fibers of the layers of tape being carbon fibers, the matrix material being a polymer.

11. The wing of claim 9, wherein the upper portion and the lower portion each include layers of tape arranged at approximate angles of 0 degrees, −45 degrees, 90 degrees, and 45 degrees.

12. The wing of claim 11, wherein the cross section of the first stringer is a trapezoidal cross section a majority of which is composed of fibers of associated layers of tape.

13. The wing of claim 1, wherein a number of the generally planar plies in the stacked plurality and disposed in the trapezoidal cross section is in a range of 100 to 200 plies.

14. The wing of claim 13, wherein opposing lateral sides of the trapezoidal cross section form respective angles with a local portion of the interior surface in a range of 15 to 60 degrees.

15. The wing of claim 1, wherein the stacked plurality of generally planar plies includes a plurality of layers of tape arranged, with respect to an axis locally perpendicular to an exterior surface, at a plurality of different angles, with an approximately 0 degree angle corresponding to fibers of the layer of tape extending generally parallel to the span-wise direction of the wing, a greater percentage of layers of tape being arranged at an angle of approximately 0 degrees in an upper portion of the trapezoidal cross section than in a lower portion of the trapezoidal cross section.

16. The wing of claim 15, wherein the upper portion and the lower portion include approximately the same number of layers of tape.

17. The wing of claim 1, wherein the stringer has opposing run-out ends.

18. The wing of claim 1, further comprising a plurality of stringers, the rib flange being continuous between adjacent stringers.

19. A method of stiffening a wing, comprising the steps of:
positioning a rib adjacent an interior surface of a laminate composite lower wing skin of the wing such that the rib is oriented generally perpendicular to a span-wise direction of the wing, wherein the wing includes a laminate composite stringer formed by a tapered stack of generally planar plies of reinforcement material structurally joined to the interior surface and extending generally parallel to the interior surface and to the span-wise direction along a substantial portion of the interior surface; and
operatively coupling the rib to the lower wing skin and the stringer at least in part by extending at least one fastener through the lower wing skin, through the tapered stack of generally planar plies, and through a flange of the rib, thereby stiffening the wing wherein the stringer has a top face distal from the interior surface, the flange of the rib contacting the top face of the stringer, and wherein the tapered stack has a generally solid trapezoidal cross section when viewed in a plane generally perpendicular to the span-wise direction such that a first ply of the stacked plurality of generally planar plies proximal the interior surface has a wider width than a second ply of the stacked plurality of generally planar plies that is further from the interior surface than the first ply, at least a majority of the solid trapezoidal cross section being characterized by the planar plies of reinforcement material, an aperture being formed through the lower wing skin and the trapezoidal cross section, and the extending step involves disposing the at least one fastener in the aperture and inserting the fastener into the flange of the rib.

20. The method of claim 19, wherein the positioning step further includes disposing an adjacent portion of the flange on the interior surface adjacent the tapered stack, and the operatively coupling step further includes fastening the adjacent portion of the flange to the interior surface by extending at least one other fastener through the lower wing skin and the adjacent portion of the flange.

\* \* \* \* \*